(12) United States Patent
Liu et al.

(10) Patent No.: US 12,284,050 B2
(45) Date of Patent: *Apr. 22, 2025

(54) SYSTEMS AND METHODS FOR ALERT SERVICES

(71) Applicant: Bank of Montreal, Toronto (CA)

(72) Inventors: Yishi Liu, Mississauga (CA); Ching Leong Wan, Toronto (CA)

(73) Assignee: Bank of Montreal, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,382

(22) Filed: Dec. 5, 2022

(65) Prior Publication Data
US 2023/0113006 A1    Apr. 13, 2023

Related U.S. Application Data

(63) Continuation of application No. 16/517,343, filed on Jul. 19, 2019, now Pat. No. 11,522,731.

(60) Provisional application No. 62/700,385, filed on Jul. 19, 2018.

(51) Int. Cl.
| | |
|---|---|
| *G06F 16/735* | (2019.01) |
| *G06F 16/783* | (2019.01) |
| *G06F 16/9535* | (2019.01) |
| *H04L 12/18* | (2006.01) |
| *H04W 68/00* | (2009.01) |

(52) U.S. Cl.
CPC ........ *H04L 12/1895* (2013.01); *G06F 16/735* (2019.01); *G06F 16/7844* (2019.01); *G06F 16/9535* (2019.01); *H04W 68/005* (2013.01)

(58) Field of Classification Search
CPC ............... H04W 68/00; H04W 68/005; H04L 12/1895; G06F 16/9535; G06F 16/7844
See application file for complete search history.

(56) References Cited

U.S. PATENT DOCUMENTS

| | | | |
|---|---|---|---|
| 10,482,391 B1 * | 11/2019 | Lynch | G06Q 10/00 |
| 11,522,731 B2 * | 12/2022 | Liu | H04W 68/005 |
| 2004/0068481 A1 * | 4/2004 | Seshadri | G06Q 30/02 |
| 2005/0027742 A1 * | 2/2005 | Eichstaedt | H04N 21/23106 |
| 2008/0015919 A1 | 1/2008 | Busse et al. | |
| 2008/0126233 A1 * | 5/2008 | Hogan | G06Q 40/00 709/207 |
| 2009/0281677 A1 | 11/2009 | Botich et al. | |
| 2011/0028135 A1 | 2/2011 | Srinivasan | |
| 2015/0350434 A1 | 12/2015 | Khalil et al. | |

(Continued)

*Primary Examiner* — Jinsong Hu
*Assistant Examiner* — Farideh Madani
(74) *Attorney, Agent, or Firm* — Foley & Lardner LLP

(57) ABSTRACT

Embodiments relate to systems, processes and devices for an information delivery platform or data hub with an alert processor that can be configured to receive a request to generate an alert configuration at the data hub, the request indicating a target unit; generate and store an alert rule corresponding to the alert configuration, the alert rule having a trigger and an action; detect an event at the data hub based on a set of data of the data stored at the data hub, the event having event data; convert the event data to an alert trigger at the data hub based on the trigger of the alert rule; generate an alert notification for the alert trigger based on the action of the alert rule; and transmit the alert notification to the target unit.

20 Claims, 38 Drawing Sheets

(56) References Cited

U.S. PATENT DOCUMENTS

| | | | |
|---|---|---|---|
| 2016/0005127 A1* | 1/2016 | Varma | G06Q 40/00 |
| | | | 705/36 R |
| 2017/0116524 A1* | 4/2017 | Hariharan | G06F 16/24575 |
| 2018/0224831 A1* | 8/2018 | Liu | G05B 23/0232 |
| 2019/0235923 A1* | 8/2019 | Collins | G06F 9/5011 |
| 2020/0026710 A1 | 1/2020 | Przada et al. | |

* cited by examiner

Stakeholder interviews revealed four general business requirements for notifications, alerts and offers going forward

Key requirements, ordered by priority

1. Alerts and offers must be based on customer preferences
   - Must allow customization of alert types, parameters for account / txn alerts, channel preference, and opt-in / out 2. Offers must be *relevant* to the customer
   - Unsolicited or irrelevant messages risk degrading the experience 3. *Channel Integration* with customer-facing channels
   - At a minimum customer facing staff must understand what notifications / alerts / offers are being sent and how they work
   - Some messages will require detailed tracking in Optimizer or other sales tools 4. *Tracking / history keeping*
   - Dependent on specific message, may be required for customer follow-up, audit or billing purposes, key to attributing business value

Potential value for BMO

- Number of interviews citing element as a business case driver for their area
- Improved customer experience (retention, NPS)
- Cost reduction (reduce calls, streamline processes)
- Sales / cross selling (offers with alerts, generate leads)
- Fraud reduction (prevent or catch txns sooner)
- Direct fee revenue (clients willing to pay a fee for alert)

Customer engagement is the number one driver of loyalty

My Alerts

Account Alerts:
- Significant Deposit → SMS   Edit Delete
  (Checking 12345)
- Large Withdrawal → SMS
  (Checking 12345,
  MasterCard ...2345)

Security Alerts:
- Suspicious Activity → SMS
  (all my accounts)
- Password Change → SMS

Offers & Notifications:
- Hot Deals → Email
- Rate Changes → Email

Settings:

Email: bob@there.com   Edit
SMS: 416-123-4567

Do not disturb me:   Edit
Between 8am-5pm
☑ Ignore for high priority alerts

Add a new Alert

FIG. 31

SYSTEMS AND METHODS FOR ALERT SERVICES

CROSS REFERENCE TO RELATED APPLICATION

This application is a continuation application of U.S. patent application Ser. No. 16/517,343, filed Jul. 19, 2019, which claims priority to U.S. Provisional Application No. 62/700,385 entitled SYSTEMS AND METHODS FOR ALERT SERVICES, each of which is hereby incorporated by reference in its entirety for all purposes. This application relates to U.S. application Ser. No. 16/517,253 entitled SYSTEMS AND METHODS FOR DATA STORAGE AND PROCESSING, the contents of which is hereby incorporated by reference in its entirety for all purposes.

FIELD

The present disclosure generally relates to the field of data storage systems and alert processing.

INTRODUCTION

A full-service financial service institution depends heavily on the use of technology to serve customers with a wide range of products and services. In addition, technology is used to meet stringent risk management and regulatory compliance.

An organization with a long history typically has adopted a myriad range of technologies from legacy platforms like mainframe to modern capabilities like mobile and analytic applications. An organization might have a large set of applications (many hundreds) through acquisition and integration.

To continue to deliver differentiating customer experience and transformation to keep pace or leap-frog competitors, both traditional and disruptive ones, an institution needs to be able to effectively and efficiently integrate the complex and diverse set of applications. An integrated enterprise not only forms the foundational capability to deliver any product and service across different channels, it also enables the ability to identify events and generates actionable insights to become an intelligent institution.

SUMMARY

Embodiments described herein generate alerts for customers/users who have a subscription to receive such alerts based on a set of defined events. Functions can be exposed via APIs.

Embodiments described herein can streamline alert Definition, Detection and Delivery via an Alerts Catalog. Embodiments described herein can capture Alerts definitions in the Alerts Catalog exposed via runtime API. The UI design can be enabled to dynamically build UX with proper eligibility and widgets. Alert templates can be generated to define subscription preferences. Customer support can see preference changes and alerts delivery history in real time. Fraud teams can subscribe to daily data feeds. IT/OP and engineer teams can decide horizontal (business domain) or vertical scale (throughput), and monitor specific operation events (error topics in the Catalog)

Embodiments described herein enable in-memory event correlation and computing for real-time detection, based on the Alerts Catalog, Transaction or fraud events, User subscriptions and preferences. Embodiments described herein enable in memory preference policy enforcement for Alerts delivery. This can enable duplicate detection, suppression, suspension. Embodiments described herein can define alerts based on (1) subscriptions; (2) event detections; (3) actions.

Embodiments described herein integrates in-memory event detection and the notification mechanism with enterprise data storage. A customer can connect to the system for transaction functions (e.g., customer is making a $10,000 deposit) and the data contained within the transaction can be useful (e.g., $10,000 is a large deposit event for this customer) and can generate actionable insight to create differentiating function (e.g., a notification to the customer for a large account balance or an up-sale offer to the customer to purchase an investment product, like mutual funds).

In accordance with an aspect, there is provided a system for generating alert notifications configured to: load and store data from a plurality of source systems at a data hub implemented by a non-transient data store; receive a request for an alert subscription at the data hub, the request indicating a subscriber and an alert configurations; generate and store an alert rule corresponding to the alert configuration, the alert rule having a trigger and an action; detect an event at the data hub based on correlated event data of the data stored at the data hub, the correlated event data corresponding to the trigger of the alert rule, the correlated event data based on in-memory event correlation and computing for real-time detection; generate an alert notification for the alert trigger based on the action of the alert rule; and transmit the alert notification to the subscriber based on the subscription.

In some embodiments, the subscriber is linked to an alert format and the alert service is configured to generate alert data using the event data, format the alert data based on the alert format of the target unit, generate the alert notification based on the alert data, and generate alert processing result data.

In some embodiments, the alert notification is assigned an alert identifier and wherein the processor stores data for the alert notification and the alert identifier in a history log.

In some embodiments, the alert notification is assigned an action identifier based on the action of the alert rule, wherein the action identifier is a pointer to code for adding the action to the alert notification.

In some embodiments, the system has an alert handler configured to monitor the alert notification for user response and record the user response in association with the alert identifier.

In some embodiments, the system has an alert subscription service configured to store a mapping between a customer identifier, customer preferences, and the alert rule, the subscriber being linked to the customer identifier.

In some embodiments, the system has an application programming interface to receive the request for the alert subscription.

In some embodiments, the system has an alerts catalogue for storing the alert rule.

In some embodiments, the system has an alert template to define the alert configuration for the alert subscription.

In some embodiments, the system integrates in-memory event detection and alert notification with the data hub.

In accordance with an aspect, there is provided systems, processes and devices for an information delivery platform or data hub with an alert processor that can be configured to receive a request to generate an alert configuration at the data hub, the request indicating a target unit; generate and store an alert rule corresponding to the alert configuration, the alert rule having a trigger and an action; detect an event at the data hub based on a set of data of the data stored at the data hub, the event having event data; convert the event data to an alert trigger at the data hub based on the trigger of the alert rule; generate an alert notification for the alert trigger based on the action of the alert rule; and transmit the alert notification to the target unit In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures;

FIG. 5 illustrates a diagram of example use cases for an alerting service system, according to some embodiments.

FIG. 30 illustrates a schematic diagram of an example interface for an alert service system, according to some embodiments.

FIG. 31 illustrates a schematic diagram of an example interface for an alert service system, according to some embodiments.

DETAILED DESCRIPTION

Figure 1A:
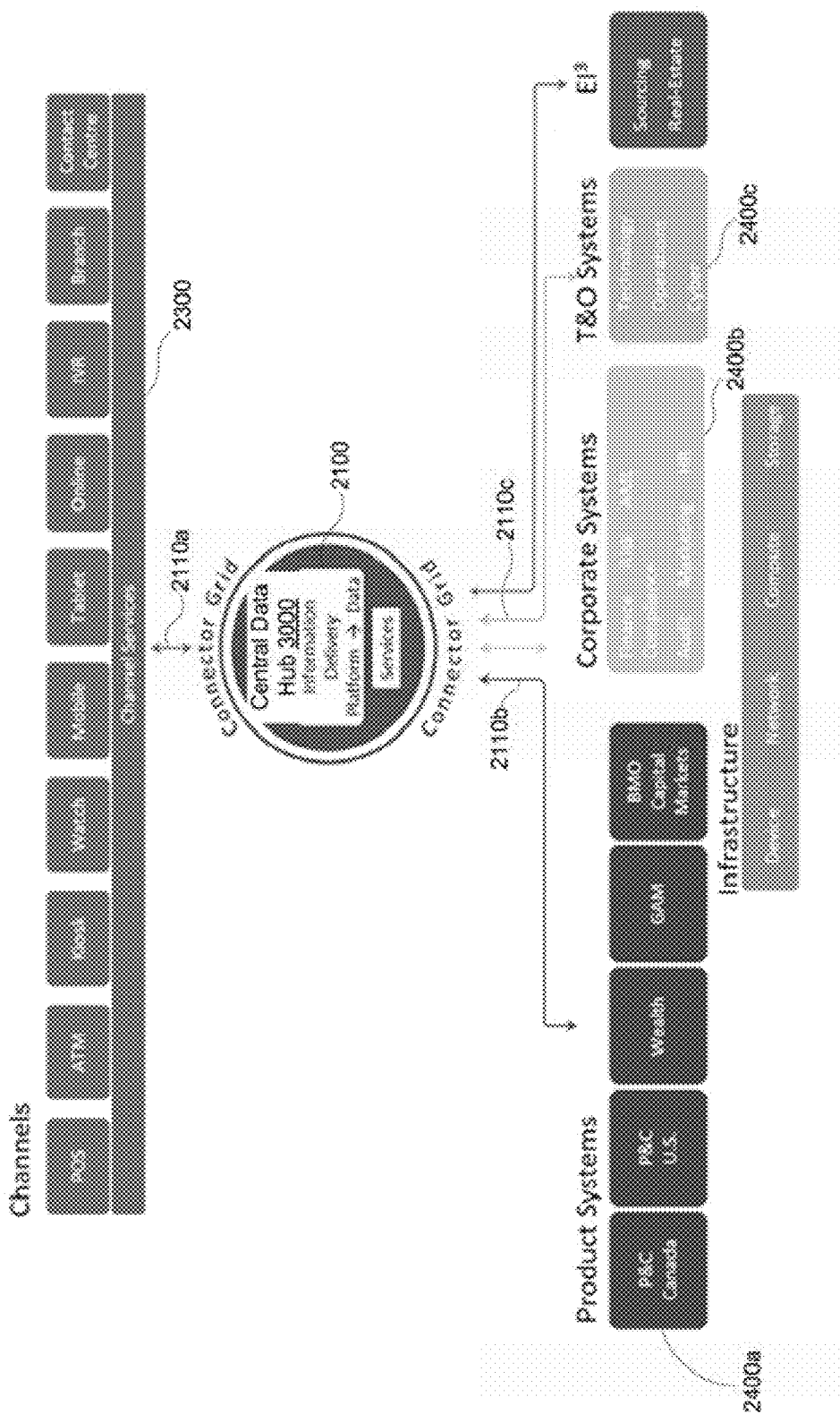
FIG. 1A illustrates a system architecture diagram of a proprietary Information Delivery Platform (IDP) in accordance with one embodiment.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Within an enterprise data warehouse, there may be large volumes of data being ingested and stored; computational demands may also be high for extracting, transforming or otherwise processing the volumes of data into end target databases or end appliances. With traditional ETL techniques, there exists a number of pain points: "data silos", which refer to data that is under control of one group or application and isolated from the rest of the organization may be common, and there may be need for replication of large volumes of data between the various appliances. In addition, computing and storage capacity are inherently coupled, and cannot be independently scaled. Data access control and security may be negatively affected.

The financial cost of data aggregation and consumption with current technology may be high, and meeting demand may become increasingly technically challenging.

Network bandwidth may also become a significant constraint for data communication between an enterprise data system and external systems, as well as in/out of the landing zone for batch data transmission for the enterprise data system.

In addition, capturing and maintaining accurate data lineage may also be challenging under the traditional approach.

There may be no "balance and control" or enterprise-level reconciliation patterns or models for data stored within a traditional enterprise data system. This may be the case if the enterprise data system serves as a book-of-reference and not a book-of-record. However, there is growing need for enterprise reconciliation or balance and control capabilities and patterns.

Improving ease of understanding of the data glossary and relationship between data/sources is needed to support self-serve data science initiatives.

The Financial Services Industry is a data driven industry. The scope, quality, cost, performance and freshness of data that has been "good enough" in the past is no longer good enough. Many critical bank processes may need low cost, easy to access, reliable and consistent data. These process include but are not limited to: Anti Money Laundering Compliance, Regulatory and Compliance Reporting, Risk Management, Customer Insights, Sales Performance Management and Channel Optimization.

While the bank has multiple "point to point" and shared data acquisition and management platforms in place, none of these platforms are currently fully meeting modern bank's needs for data reliability, flexibility, low cost and performance.

The Information Delivery Platform described in the embodiments herein incorporates new technology, a new operating model that optimizes the accountabilities for data quality and a simplified approach to information management. This platform may provide information management capability to meet the rapidly increasing demand for low cost, easy to access, reliable and consistent data.

Referring now to FIG. 1A, which illustrates a system architecture diagram of an example Information Delivery Platform (IDP) 2100 with Channels 2300, Product Systems 2400*a*, Corporate Systems 2400*b* and T&O (Technology and Operation) Systems 2400*c*.

In an example embodiment, IDP 2100 is a data aggregation, processing, and analytics environment, combining multiple sources of data into a single organization-wide repository, and providing fast and cost-effective access to data.

In the present application, as an example, the organization is a bank. However, it should be appreciated that the organization can be any type of organization or company that may need storage and processing of data for daily operations. For example, the organization can be a government entity, a law firm, a school, a store, or a restaurant, and so on.

IDP 2100 can provide more data in less time. IDP 2100 can provide users with a high performance platform for processing queries. IDP 2100 can provide built in data quality management, high availability and disaster recovery. IDP 2100 can have an innovative operating model provides subscriber businesses a direct CIO accountability to ensure their specific needs are met. IDP 2100 can provide the opportunity to eliminate data sprawl by eliminating the motivations to create redundant and overlapping data marts. IDP 2100 can provide the following benefits: CIO accountability model means conversations about sourcing data, its content and it's quality take place directly between the owners of the source systems and the consumers of the data; high performance, cost efficient staging platform means improved query performance and lower costs for accumulating low level detail data; data quality management means problems in the source data are identified early and actively managed; consumer driven data model means the integrated database structures are presented in simple, business friendly terminology; and provides for self-serve data usage.

IDP 2100 is a shared information management component of the Analytical/Data Hub that can provision well managed data to meet multiple reporting and analytical requirements quickly and efficiently. IDP 2100 can provide an innovative operating model that leverages the strengths of all stakeholders and eliminates unnecessary hand offs. It is built from the ground up to meet the requirements of regulators and business process that demand on-going demonstration of data quality management and proof that the data is an accurate and complete representation of reality. It presents data to the business community using industry and bank terminology. It will provide the opportunity to eliminate data sprawl by eliminating the motivations to create redundant and overlapping data marts. It may provide robust, highly resilient infrastructure, DR (Disaster Recovery), high performance as most queries and loads run in a fraction of the time of existing platforms, easy tracking of data assets under management, data stewardship and data governance, data quality management and reporting capability, and data in cross application integrated (L2) model.

In one example embodiment, central data hub 3000 includes IDP 2100. In one embodiment, the IDP 2100 may include a scalable data store (also referred to as a "data lake"), which may collect and store massive amounts of data for long periods of time. The data stored may be structured, semi-structured, unstructured, or time-sensitive data (e.g. events, etc.). A central aggregation and distribution point ("book of reference") may be generated for all book-of-record data within the bank, which provides consistent and efficient access to reference data. Both raw and processed data within the data lake may be available for consumption; powering analytics; machine learning; consumer-specific data accessible via batch, SQL, streaming, native Hadoop APIs. Linear scalability of data is also provided.

In some embodiments, IDP 2100 is connected to channel services 2300 through connector grid 2110*a* and connected to product systems 2400*a*, corporate systems 2400*b* and T&O systems 2400*c* through connector grids 2110*b* and 2110*c*.

Channel services 2300 may include internal or external interfaces adapted for different service groups, such as Point-of-Sale (POS) terminals, watch interfaces, mobile devices, tablet devices, online portals, ATMs, branches, call centers, sales forces, and so on. Each of these service group may receive and utilize data from IDP 2100 through connector grid 2110*a*. Each channel may have a user interface designed to display various data and information and to receive user inputs.

Across channels 2300, customer information is captured consistently at all points of collection for all LOBs and channels, aligned to standards defined for the Enterprise Customer Domain. A single view of customer information and aggregate view of customer holdings can be displayed on channels, in real-time or near real-time, and on demand if necessary.

In addition, product systems 2400*a*, corporate systems 2400*b* and T&O systems 2400*c* may also receive and utilize data from IDP 2100 through connector grids 2110*b*, 2110*c*.

IDP 2100 may receive raw data from a variety of data sources. Data sources include, among others:

Book of record transaction systems (BORTS)
Clickstreams (web-logs)
Social media
Server/machine logs
Unstructured data
Real-time event streams Raw data may be received and stored into a staging area. The staging area may be part of a "data lake" foundation from which groups across the organization can draw needed data. This staging area may be also referred to as "level 0 (L0)" data storage.

For example, when the organization is a bank, different groups may utilize data from the data lake. The groups may include: AML (Anti-Money Laundering), regulatory organizations or protocols, industry associations, U.S. Heightened Standards, Enterprise Wire Payments, LOB (Line of Business) Scorecards, Corporate Audit Analytics, Fraud/Criminal Risk Investigation, Legacy Data Marts Simplification.

IDP 2100 may be the foundation for the overarching data environment, combining multiple sources or book of record transaction systems (BORTS) into a single organization-wide repository and provides fast and cost-effective access to both raw and conformed data.

Figure 1B:
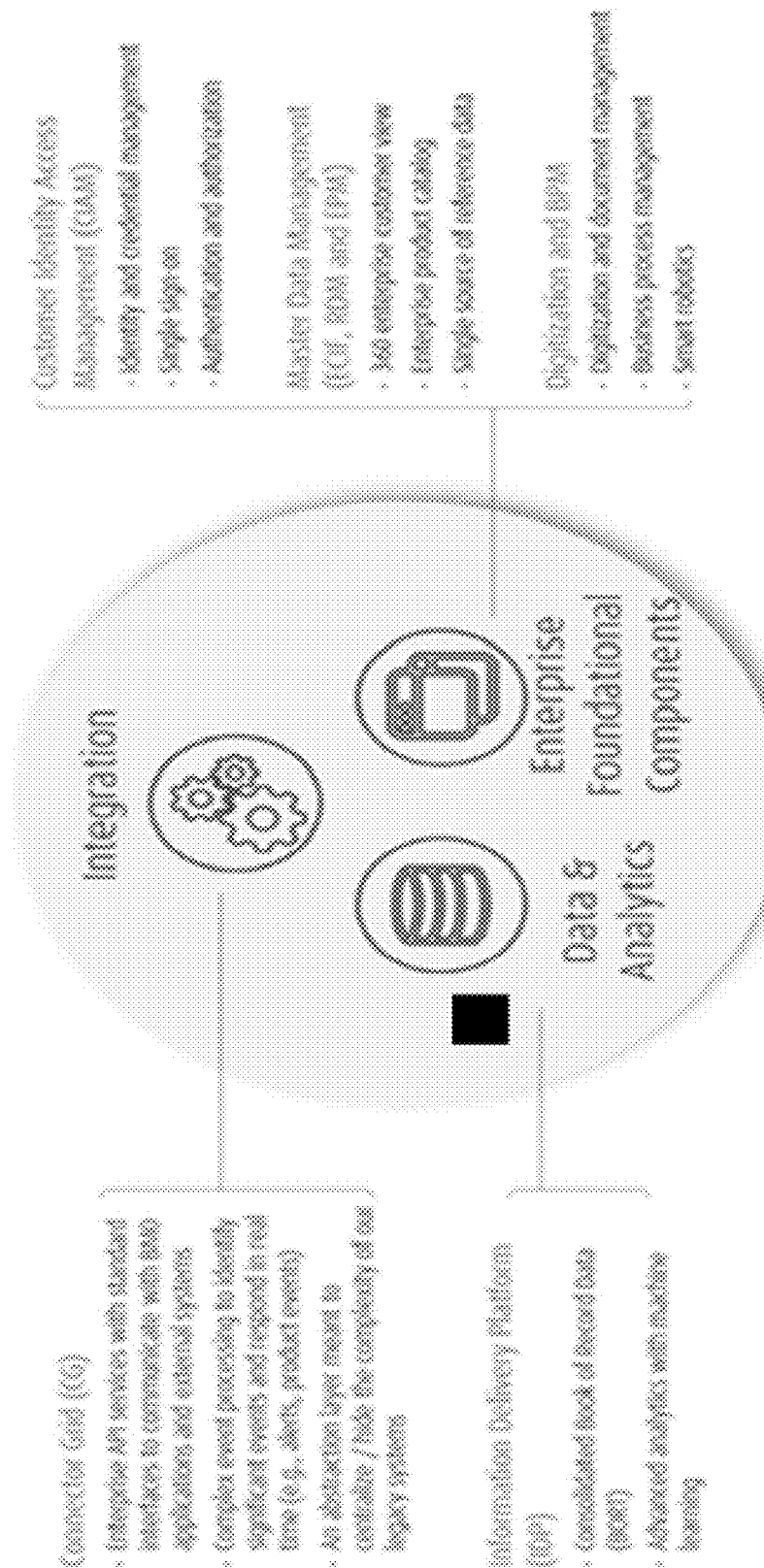
FIG. 1B is a view of components of a data storage and processing system including IDP.

FIG. 1B is a view of components of a data storage and processing system. The system includes an integration component, data and analytics component, and enterprise foundational components. The integration component has a connector grid. The connector grid provides enterprise API services with standard interfaces to communicate with applications and external systems. The data and analytics component has a consolidated Book of Record Data (BORT) and advanced analytics with machine learning.

The enterprise foundational components include CIAM for identity and credential management. CIAM enables single-sign on for data access with authentication and authorization. The enterprise foundational components include Master Data Management components ECIF, RDM, and EPM to provide a 360 degrees, holistic customer view of data. The Master Data Management components have an enterprise product catalog. The Master Data Management components provide a single source of reference data. The enterprise foundational components include digitization and business process management for digitization and document management with smart robotics.

Example embodiments of an alert service system is described. In some embodiments, the alert service system is interconnected with IDP 2100. The IDP 2100, in some embodiments, is configured to include Bank Enterprise Architecture, Technical Architecture, and Enterprise Alert Service. IDP 2100 integrates an alert service to provide in-memory event detection and the notification mechanism. Since users are able to connect for transaction functions (e.g., customer is making a $10,000 deposit), the information contains within the transaction is useful (e.g., $10,000 is a large deposit event for this customer) for the alert service and can generate actionable insight to create differentiating function (e.g., a notification to the customer for a large account balance or another action).

Embodiments described herein generate alerts for customers/users who have a subscription to receive such alerts based on a set of defined events. Functions can be exposed via APIs.

Embodiments described herein can streamline alert Definition, Detection and Delivery via an Alerts Catalog. Embodiments described herein can capture Alerts definitions in the Alerts Catalog exposed via runtime API. The UI design can be enabled to dynamically build UX with proper eligibility and widgets. Alert templates can be generated to define subscription preferences. Customer support can see preference changes and alerts delivery history in real time. Fraud teams can subscribe to daily data feeds. IT/OP and engineer teams can decide horizontal (business domain) or vertical scale (throughput), and monitor specific operation events (error topics in the Catalog)

Embodiments described herein can provide in memory event correlation and computing for real-time detection, based on Alerts Catalog, Transaction or fraud events, User subscriptions and preferences. Embodiments described herein can provide in memory preference policy enforcement for Alerts delivery to duplicate detection, suppression, and suspension.

Embodiments described herein can define alerts using subscriptions, event detections and actions.

Embodiments described herein enable in-memory event correlation and computing for real-time detection, based on the Alerts Catalog, Transaction or fraud events, User subscriptions and preferences. Embodiments described herein enable in memory preference policy enforcement for Alerts delivery. This can enable duplicate detection, suppression, suspension. Embodiments described herein can define alerts based on (1) subscriptions; (2) event detections; (3) actions.

Embodiments described herein integrates in-memory event detection and the notification mechanism with enterprise data storage. A customer can connect to the system for transaction functions (e.g., customer is making a $10,000 deposit) and the data contained within the transaction can be useful (e.g., $10,000 is a large deposit event for this customer) and can generate actionable insight to create differentiating function (e.g., a notification to the customer for a large account balance or an up-sale offer to the customer to purchase an investment product, like mutual funds).

In accordance with an aspect, there is provided a system for generating alert notifications configured to: load and store data from a plurality of source systems at a data hub implemented by a non-transient data store; receive a request for an alert subscription at the data hub, the request indicating a subscriber and an alert configurations; generate and store an alert rule corresponding to the alert configuration, the alert rule having a trigger and an action; detect an event at the data hub based on correlated event data of the data stored at the data hub, the correlated event data corresponding to the trigger of the alert rule, the correlated event data based on in-memory event correlation and computing for real-time detection; generate an alert notification for the alert trigger based on the action of the alert rule; and transmit the alert notification to the subscriber based on the subscription.

In some embodiments, the subscriber is linked to an alert format and the alert service is configured to generate alert data using the event data, format the alert data based on the alert format of the target unit, generate the alert notification based on the alert data, and generate alert processing result data.

In some embodiments, the alert notification is assigned an alert identifier and wherein the processor stores data for the alert notification and the alert identifier in a history log.

In some embodiments, the alert notification is assigned an action identifier based on the action of the alert rule, wherein the action identifier is a pointer to code for adding the action to the alert notification.

In some embodiments, the system has an alert handler configured to monitor the alert notification for user response and record the user response in association with the alert identifier.

In some embodiments, the system has an alert subscription service configured to store a mapping between a customer identifier, customer preferences, and the alert rule, the subscriber being linked to the customer identifier.

In some embodiments, the system has an application programming interface to receive the request for the alert subscription.

In some embodiments, the system has an alerts catalogue for storing the alert rule.

In some embodiments, the system has an alert template to define the alert configuration for the alert subscription.

In some embodiments, the system integrates in-memory event detection and alert notification with the data hub.

Embodiments described herein generate alerts (e.g., SMS or email notification) to customers/users who have a subscription such alerts (e.g., defined the interest/subscription in the Mobile Banking Application) based on a set of defined events (e.g., when my chequing account balance is less than $100). The alert definition, detection and delivery is integrated with data storage to provide an in-memory solution. This can enable efficient event detection.

Figure 2:
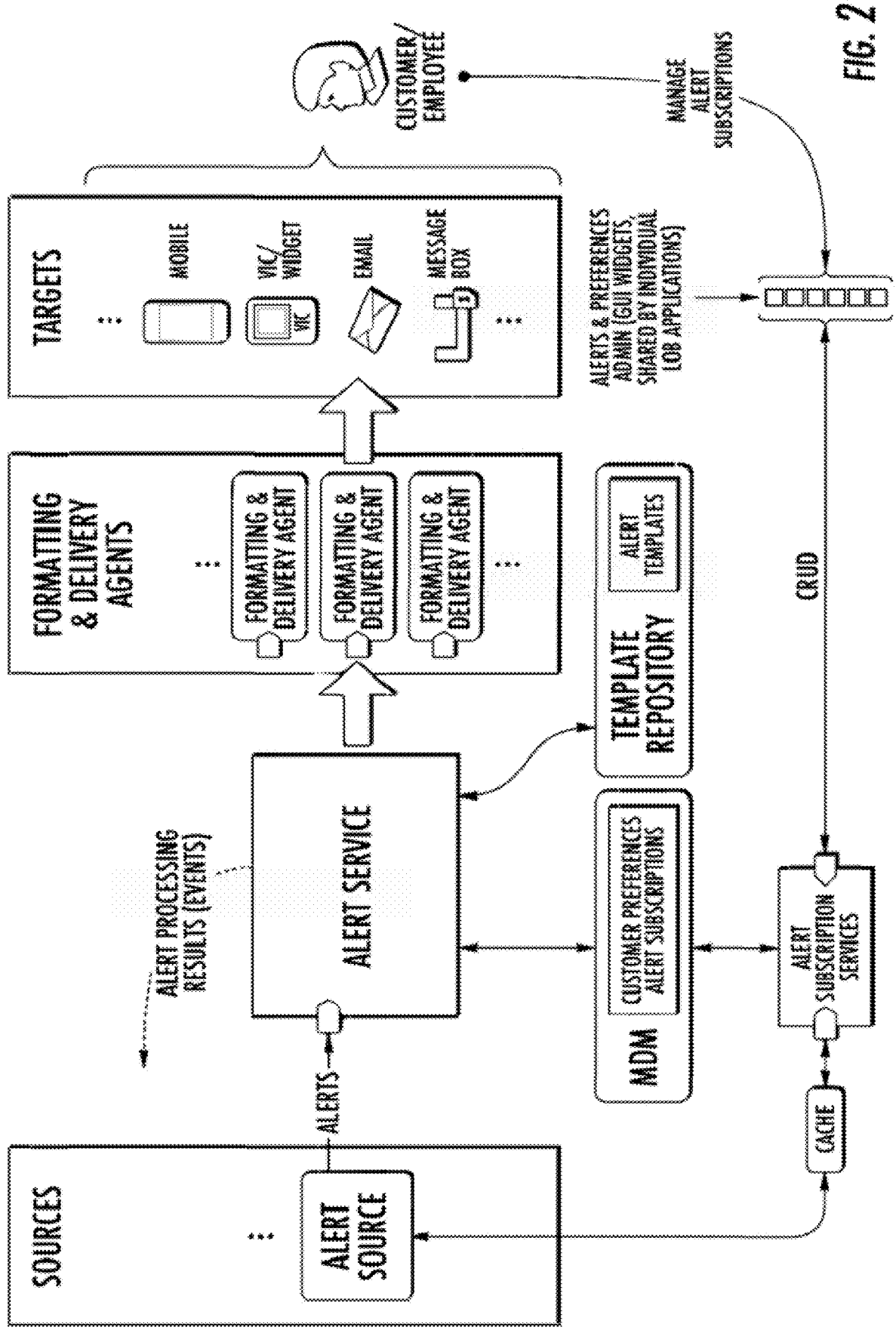
FIG. 2 illustrates a schematic diagram of an example alerting service system, according to some embodiments.

FIG. 2 depicts an example Bank Technical Architecture (TA) for an example Alert Service. The Alert Service includes connectivity with sources, formatting and delivery agents, and targets. The Alert service can use MDM and a template repository unit.

The Alert Service can provide a reliable, scalable shared service for delivering outbound communications ("alerts") to customers.

The "Alerts" Taxonomy and Canonical Model can provide an Enterprise-wide taxonomy and canonical model for "alerts"—that is, alerts, notifications and offers. Alert Subscription can allow customers to create alert subscriptions or configurations that can trigger alert notifications. "Alert" Formatting and Delivery can enable processing, formatting and delivery of alert notifications (alerts, offers, notifications) to alert targets.

The example Alert Service can use the following style and patterns at a logical level of each of the following example components.

| Style/Pattern Name | Level | Where Used |
| --- | --- | --- |
| Online transaction processing (OLTP)/Request-Reply | Logical | Alerts Detection Service Direct Alert Source |
| Canonical Data Model | Logical | Alerts |
| Batch/Batch to OLTP | Logical | Batch Alert Source |
| Scatter-Gather | Logical | Alert Subscription Service |
| OLTP/Content Enricher | Logical | Alert Service - Prioritization and Enrichment |
| OLTP/Service Grid | Logical | Alert Subscription Service - Caching with Service Grid |

In some embodiments, the Alert Service can implement a "pull-based" approach, where the Alert Service can be rolled out incrementally, with capabilities being added as/when requested by projects of an organization by way of incremental alert configurations.

Example use cases for the Alert Service are Enterprise Wire Payments and electronic statement or eStatement notifications.

An example alert system can have a number of features including providing duplicate capabilities (including for mobile solutions for banking, payment, and credit; SMS; messaging services; online banking solutions; custom alerts "engines"); scattering of customer preferences and alert subscriptions (e.g. multiple preference and alert subscriptions stores, inconsistencies and widely differing capabilities across applications and lines of businesses); no "single view" of customer communications; support for different types of "targets" (SMS, email, etc.); adding new "alerts"; implementation across lines of businesses; and reuse or sharing capabilities.

In some embodiments, the alert system is provided at an enterprise level, ingesting large amounts of data from a wide variety of sources, including different lines of businesses within the enterprise. In some embodiments, the alert system streamlines the lifecycle for implementing requirements to provide alert services to a variety of different contextual environments acceptable to a variety of systems, applications, or appliances, for example, specific to different lines of businesses of an enterprise. Each line of business may interconnect with systems or applications that are best suited to receive certain kinds of data or data in specific formats, for example. In some embodiments, the alert system integrates different vendor offerings, providing functionality to these different systems, for example, without requiring the duplication of resources, data, or computer services. As it may be otherwise unfeasible to provide a single alert system, including alert service, across an enterprise, the alert system, in some embodiments, may address this and avoid the need for hard coding or duplicating various features of the alert service in different systems within an enterprise.

For example, in some embodiments, the alert system includes an alert catalogue that provides definitions of alerts, for example, data attributes, flags, and other structures that enable a computer system to use and process the alerts, including initiating notifications upon occurrence of certain events (e.g. automatically using a listener) and/or based on other data (e.g. using handlers). In some embodiments, an alert definition includes a trigger and an action.

In some embodiments, the alert system is configured to call the alert catalogue and dynamically render a visual interface element accessible to a user. Examples of an alert definition registered through the catalogue may be to send a notification to a certain individual if a price is lower than $10.

A user can engage with a user unit included in the alert system to subscribe to various alerts and/or provide input that will be used by the alert system to generate and register a new definition in the alert catalogue. A user can make changes to various features, including alert definitions. In some embodiments, the alert system provides a dynamic user interface that populates interface elements to provide a user-friendly view or perspective of the catalogue.

In some embodiments, the alert system is configured to provide delivery of alerts to all the users in the enterprise who are subscribed to the alert. Delivery of each instance of the alert, including its content, may be based on data associated with the individual receiving the alert. For example, for the same alert, different users may receive different personalized messages.

In some embodiments, an alert catalogue is configured to register all dynamic data elements. The dynamic data elements can be configured by data in an alert template, for example. Alerts may be managed using a queue system, based on various times of time indicators.

In some embodiments, data related to or stored by the alert system, for example, data in the alert catalogue and meta data related to its use and updates, is provided to users, for example, on request by an analytical team. In some embodiments, a machine learning unit, for example, included in the IDP or interconnected with the IDP, is configured to receive the data.

In some embodiments, channels interconnected with the alert system are configured to dynamically call functions defined in an API to dynamically render a user experience and generate subscriptions so that a user can make changes to alert definitions, for example. At runtime, in some embodiments, a catalogue entry or definition is loaded into an alert engine, for example, to generate alerts when the definition criteria are met. In some embodiments, new alerts are defined (e.g. using a template or rules) and this may not require changes to the alert engine or application code, and customer preferences and contextual data are automatically captured and stored.

A dynamic user interface is provided to allow subscriptions to be managed. In some embodiments, elements within the user interface allow presentation and modification of alerts or alert data affecting enterprise-wide subscriptions. In this way, the alert system is configured to provide a centralized alert management system that avoids or reduces the duplication of large amounts of data or the need for separate alert services that are individually tailored to the specific contextual environments of different computer systems or lines of businesses.

In some embodiments, the alert system maintains alert-related data, including alerts, alerts generated, notifications sent, and other data. This data can be used by a fraud team to categorize for different purposes.

In some embodiments, the alert system or alert engine is configured with an adaptive or dynamic mechanism to provide additional security and reliability control, for example, based on the type of message and type of channel (for example, through which the message is sent to a user). In some embodiments, the alert system includes an adaptive mechanism to add controls relating to security.

In some embodiments, the alert system is configured to detect duplicate or similar alerts as well as duplicate deliverables to the same location, address, or user, for example, those alerts defined in the alert catalogue or received by different users or systems updating the alert system.

In some embodiments, the alert system is configured to handle (e.g. generate, receive, deliver, and/or store an associate definition in an alert catalogue) actionable alerts, for example, a two-way SMS or other asynchronous data exchanges. For example, the alert system is configured to detect such exchanges or data associated with such exchanges and manage actionable alerts from different requesters (e.g. an enterprise fraud alert). In some embodiments, the alert system is configured to implement complex event processing and timing, as well as tracking of the original source of an SMS, for example. For example, in the context of an external service providing an electronic wallet or electronic pay capabilities, the alert system is configured to generate alerts and trigger specific deliveries depending on the nature of the alert. As an example, the alert system can be configured to inform a user when their email changes or their credit card is rejected in relation to their electronic wallet service.

In some embodiments, the alert service is configured to provide APIs that can be used by different channel services, mobile applications, support applications, and other computer systems with different environments and technical requirements. This allows a single alert service to provide complex functionality across an entire enterprise, including different lines of business and services with different needs within that enterprise. This can provide a highly scalable system with capability to process a high number of transactions. Horizontal scalability can be provided to support different types of transactions and vertical scalability can be provided to interoperate with different applications and channels.

In some embodiments, businesses directly contribute to alerts definitions for both functional and non-functional requirements. The information can be captured in an alerts catalog, which is exposed via a runtime API. The alert service can include a user interface unit, which is configured to provide a user interface design that is enabled to dynamically build a user experience with proper eligibility and widgets. The business may engage with the user interface unit to construct alerts templates. Other users, for example, administrators or customer support teams, can access and view preference changes and alert delivery histories in real time via the user interface unit. For example, a fraud team may subscribe to a daily alert data feed via the IDP. As another example, an IT or engineer team can engage with the alert system to configure horizontal (e.g. business domain) or vertical (e.g. throughput) scale of the alert system, for example, configure which systems, lines of businesses, and amount of data that can engage with the alert system, as well as monitor specific operation events (e.g. errors).

In some embodiments, the alert system provides a streamlined alert definition, detection, and delivery via an alert catalogue. In some embodiments, the alert system provides determination and storage (e.g. transient storage) of event correlation data and computing for real time detection based on, for example, alert catalogue data, transaction or fraud events, and/or user subscriptions and preferences. In some embodiments, the alert system provides storage (e.g. transient storage) of preference policy enforcement data for alerts delivery. This may include functionality for detection of duplicates, suppression, and suspension.

In some embodiments, the alert system is configured to provide publication of actionable alert events, for example, including two-way asynchronous SMS message correlation capabilities. In some embodiments, alert system is configured to detect alert delivery errors or failures, including, for example, detection of emails that could not be delivered (e.g. bounced emails).

In some embodiments, the alert system is configured to enable its functionalities and capabilities via APIs. For example, APIs allow for the alert system functions to be exposed to different services, channels, applications, appliances, and systems.

Figure 3:
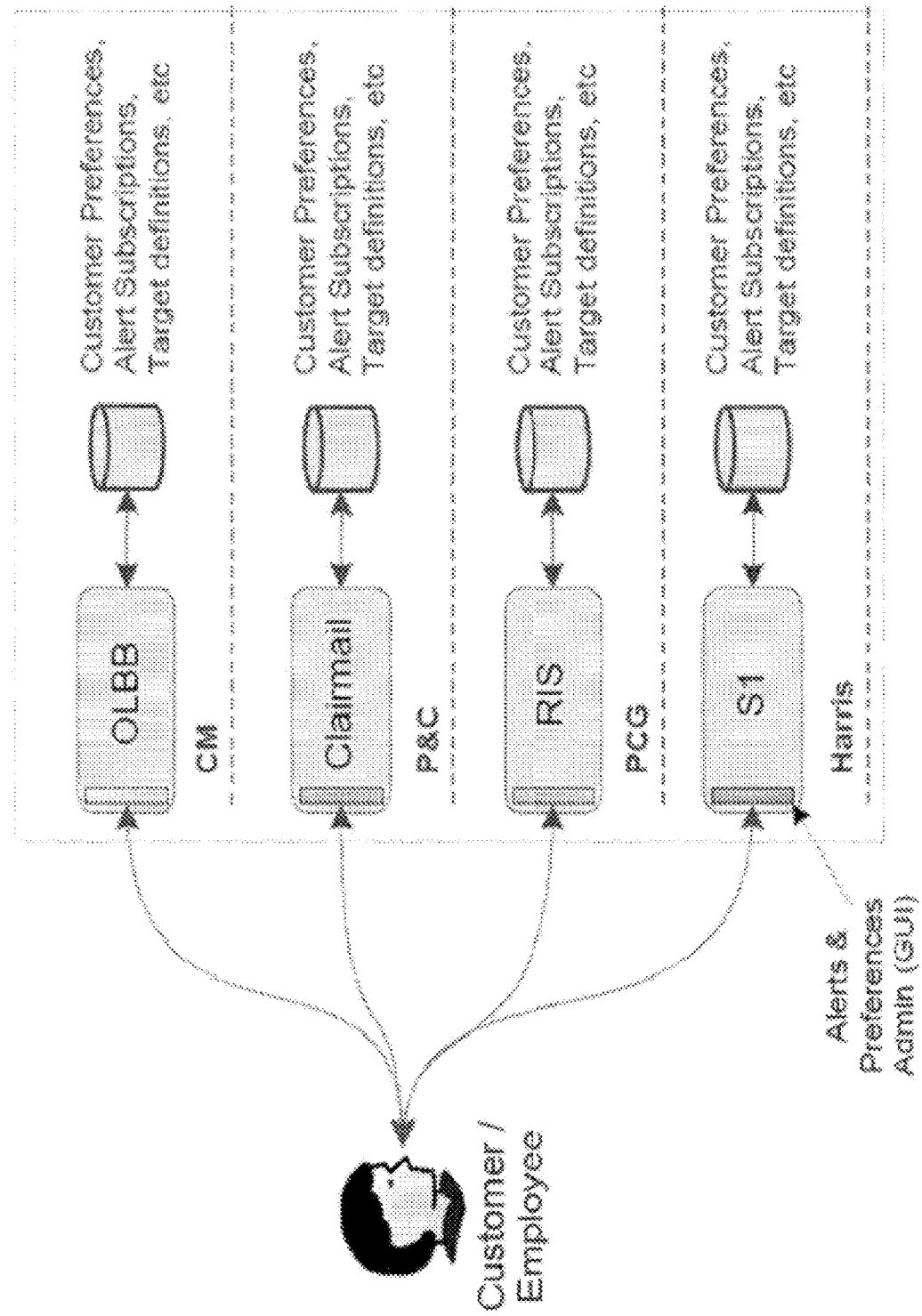
FIG. 3 illustrates a schematic diagram of an example alerting service system, according to some embodiments.

FIG. 3 is a schematic diagram of an example architecture for Alert Subscriptions in an example Alert Service, according to an alert system. As depicted, customer preferences, alert subscriptions, and target definitions are provided to each of different services in separate processes from separate data stores.

Figure 4:
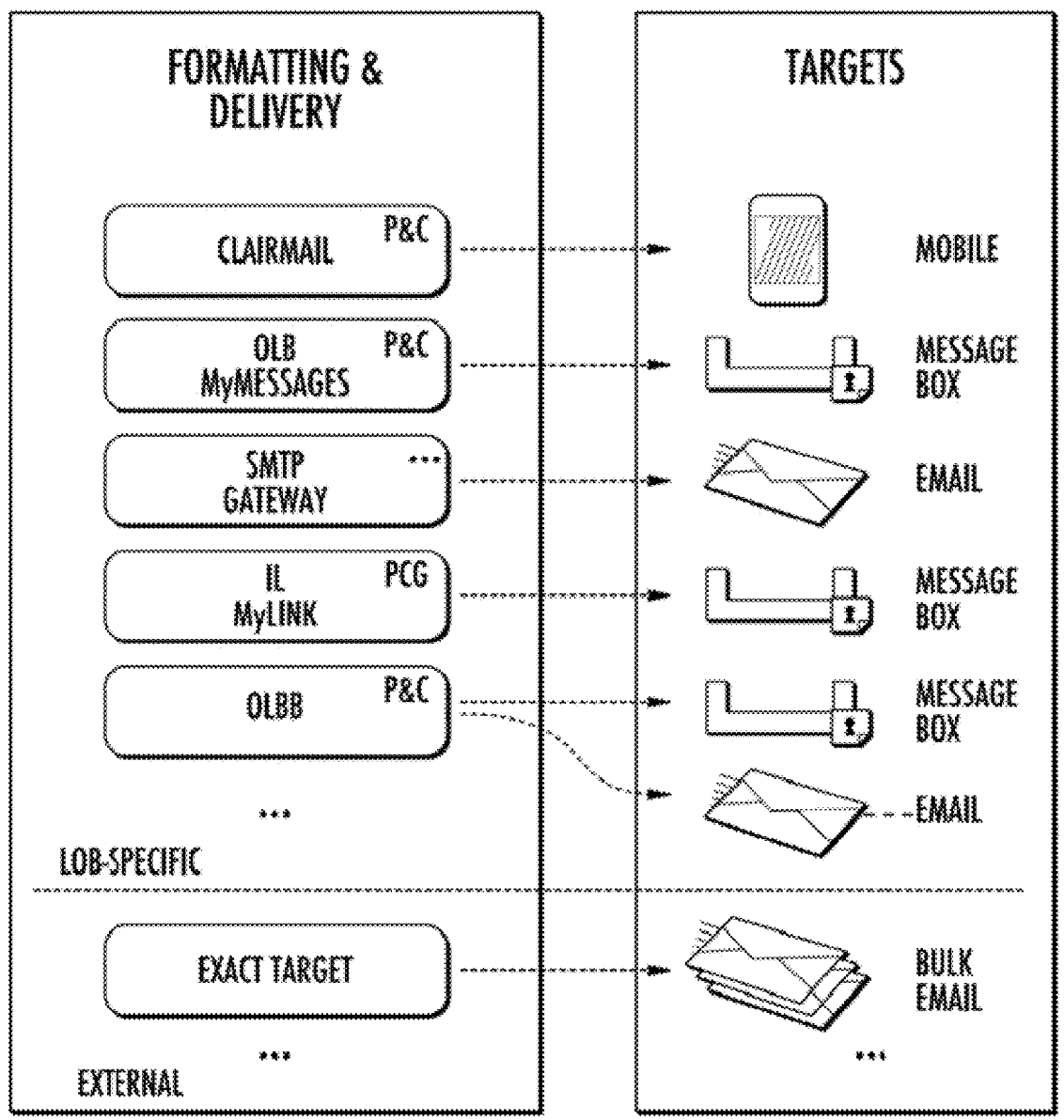
FIG. 4 illustrates a schematic diagram of an example alerting service, according to some embodiments.

FIG. 4 is a schematic diagram of an example architecture for Formatting and Delivery in an example Alert Service, according to an alert system. As depicted, transmission of data between different formatting and delivery units and different target devices or units is separate.

A summary of example capabilities for an alert service system is as follows:

| Current Processes | Associated Application | Functions Executed by Application | Application Redundancy | Application Dependencies | Efficiencies in Application |
|---|---|---|---|---|---|
| Format "alerts" | Online banking, payment, and credit services; financial platforms | Format alert "messages" using application-provided templates and styles. | Duplicate "formatting" capabilities exist across LOBs/applications. | N/A | Formatting managed within each application. |
| Deliver "alerts" | Online banking, payment, and credit services; financial platforms | Deliver alerts to "targets" supported by individual application using application-specific mechanisms. | Duplicate "delivery" capabilities exist across LOBs/applications. | N/A | Delivery managed within each application. |
| Manage Entitlements | Online banking, payment, and credit services | Allow management of alert entitlements | None | N/A | Entitlements managed within OLBB |
| Manage alert subscriptions | Online banking, payment, and credit services; financial platforms | Allow customers to "subscribe" for alerts and specify the target/s to which a given alert must be sent. | Distinct "alert subscription and preferences" stores exist across LOBs/applications. | N/A | Alert Subscriptions managed within each application. Clairmail: Alert Subscriptions stored outside of FI and Clairmail becomes a bottleneck when adding new alert types. |
| Alert "Processing" | Online banking, payment, and credit services; financial platforms | Alerts are received from alert sources, stored, scheduled for delivery and then delivered. | Similar alert "processing logic" exists in multiple applications. | N/A | Alert processing is performed within each application. |
| Operations view | Online banking services | Operations staff can view alerts, see alert status (delivered/failed, etc.) and (?) resend failed alerts. | None | N/A | |

An example alert service system is configured to provide a number of features, including an improved experience for customers (e.g. flexible ("I can create alerts for things I care about . . . "), consistent ("Let me set my preferences easily, in one place"), easy to use ("This is so easy to use"), reliable); shared capabilities and reuse of components (e.g. reduce costs by enabling enterprise-wide reuse, provide the capabilities and reliability needed by each LOB); and agility (e.g. enable incremental migration from an architectural state (e.g. as described above in relation to an alert system with some drawbacks) to a further improved architectural state; and fit in with existing systems and infrastructure of an organization.

FIG. 5 is a schematic diagram of example features of some embodiments of an alert services system. As depicted, the alert services system provides alerts and offers based on customer preferences, offers that are relevant to the customer, channel integration with customer-facing channels, and tracking or history keeping. This can provide an improved customer experience, cost reduction, cross selling opportunities, fraud reduction, direct fee revenue, for example, where a customer is willing to pay a fee for an alert, and improved customer engagement.

An example alert delivery service system is configured to provide enterprise-wide "alerts" taxonomy, using a canonical model (e.g. both fire-and-forget and actionable "alerts" (notifications, alerts, offers)); service of multiple "targets" (e.g. SMS, email, message-box, fax, UIC, etc.), including secure delivery (where applicable); scalable, reliable, high performance architecture; delivery confirmation (where possible); an ability to notify alert sources upon alert delivery, failure, etc. (e.g. to support billing); communication history (record of previously sent alerts); an easy migration path for existing systems; and support for federated formatting and delivery.

Figure 6:
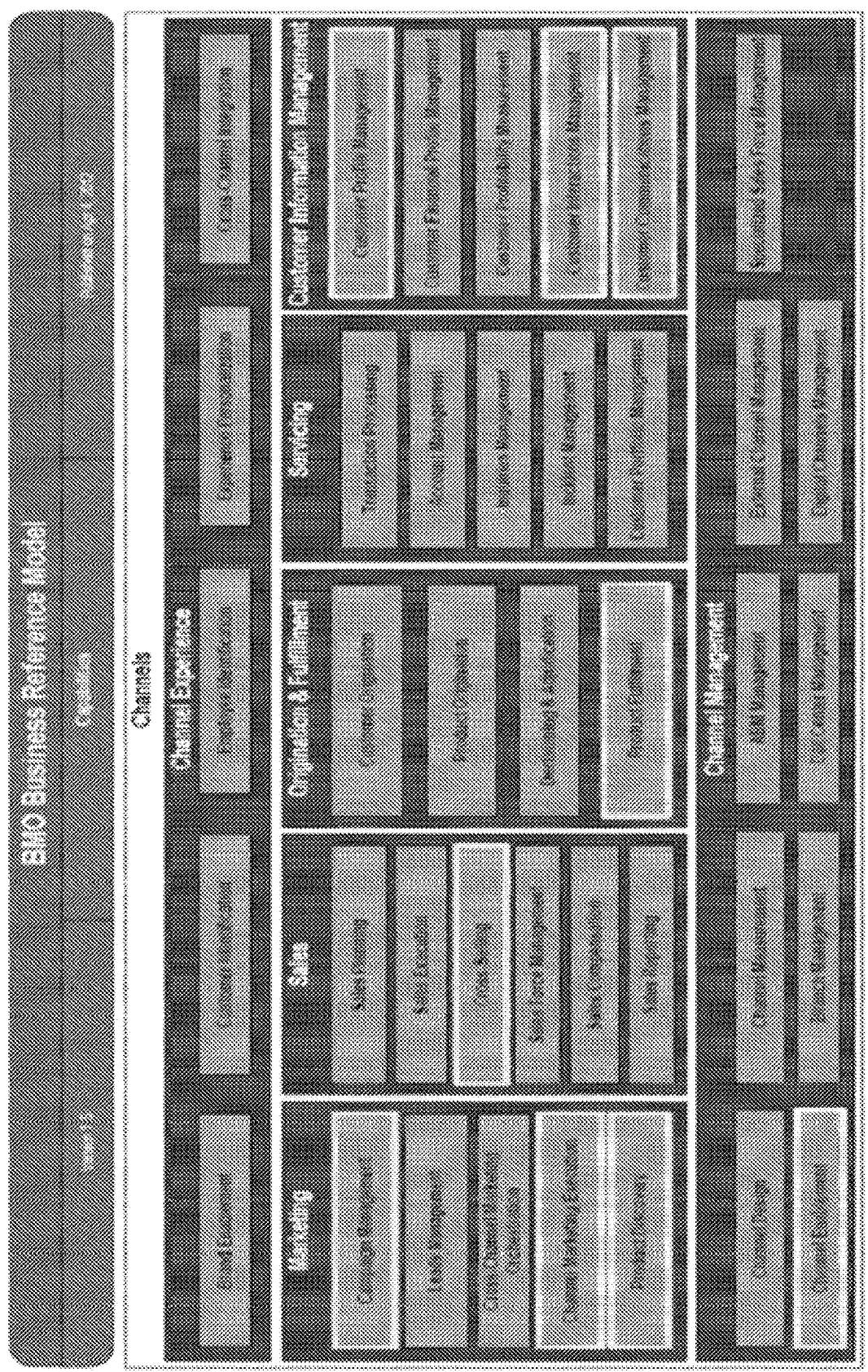
FIG. 6 illustrates a schematic diagram of an example alerting service system, according to some embodiments.

FIG. 6 is a schematic diagram of example Business Capabilities and corresponding units in the underlying architecture of an example alert services system. As depicted, the alert services system includes a number of channels and units, such as marketing units, sales units, origination and fulfillment units, servicing units, customer information management units, channel experience units, and channel management units.

Figure 7:
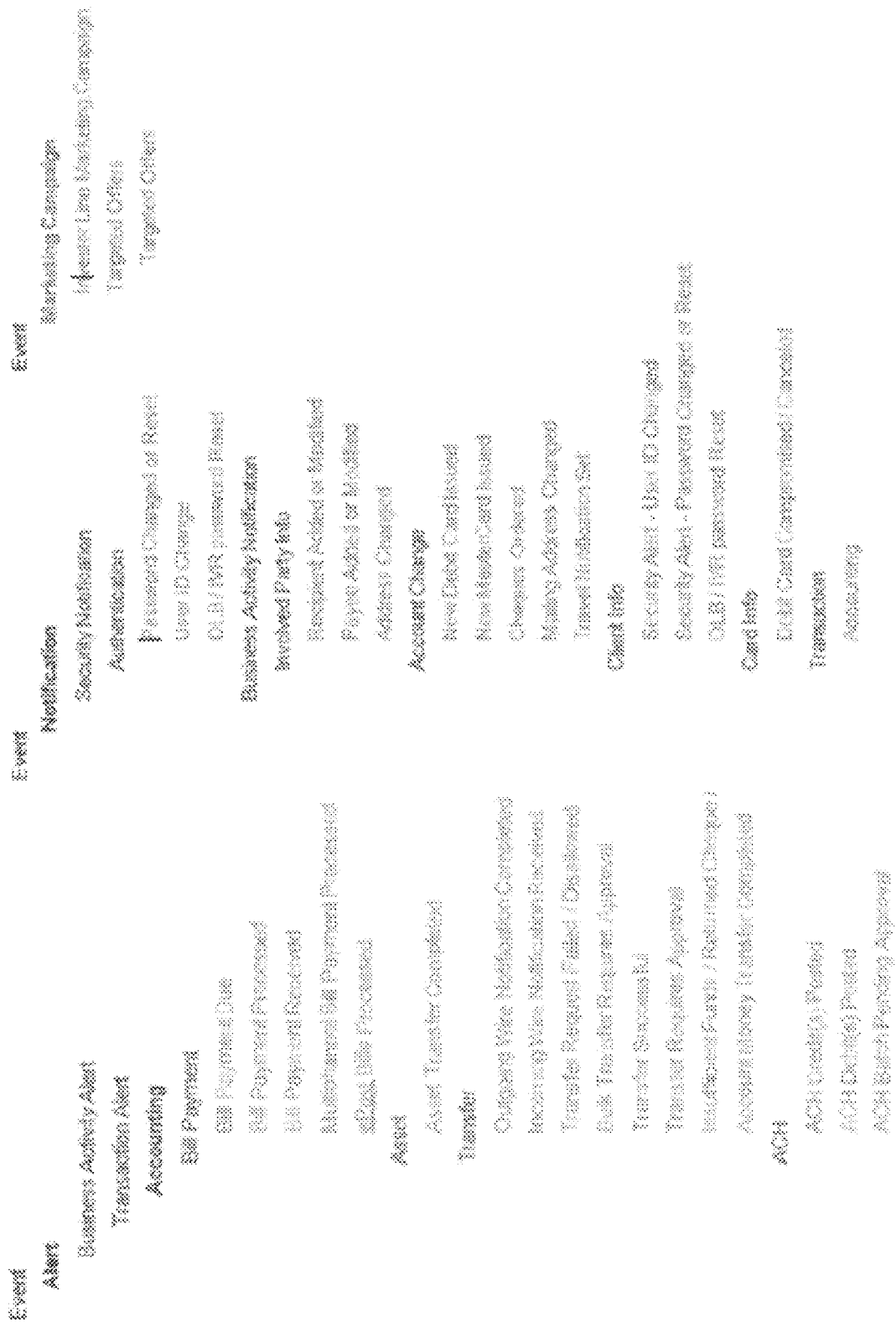
FIG. 7 illustrates a diagram of example use cases for an alerting service system, according to some embodiments.

FIG. 7 is a schematic diagram of an example alert taxonomy of an alert services system. As depicted, the system can provision alerts, notifications, and targeted offers, based on events. These can be provided using architecture described or corresponding logical units.

Figure 8:
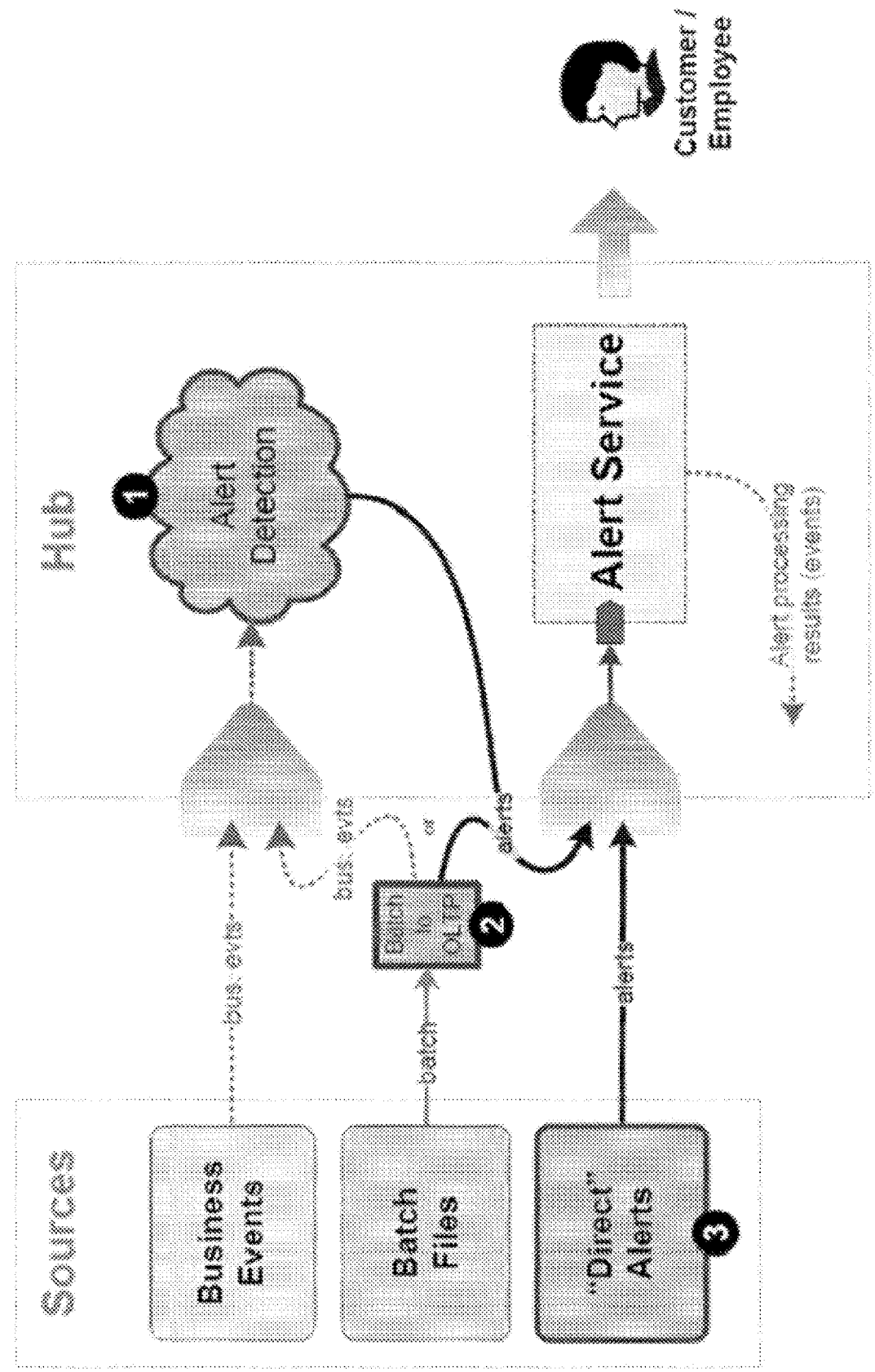
FIG. 8 illustrates a schematic diagram of an example alerting service system, according to some embodiments.

FIG. 8 is a schematic diagram of an example architecture of an alert services system. As depicted, the architecture can implement sources to produce business events and utilize CEP on the Hub to convert events into alerts. The architecture can also provide that Batch-to-OLTP be performed outside of the Hub or within the Hub. Legacy systems and non-Hub-based implementations can directly produce alerts.

There may be 3 types of Alert Sources in an example alert service system:
1) Alert Detection (CEP, say)
2) batch process into a real-time based process or transaction
3) "Direct" Alert producers Sources can be internal or external to the organization system e.g. bank. Product systems and channels (e.g. MECH, NCCS, OLBB) can generate both business events, batch files, etc., while Applications (e.g. RIS) may generate alerts directly).

Figure 9:
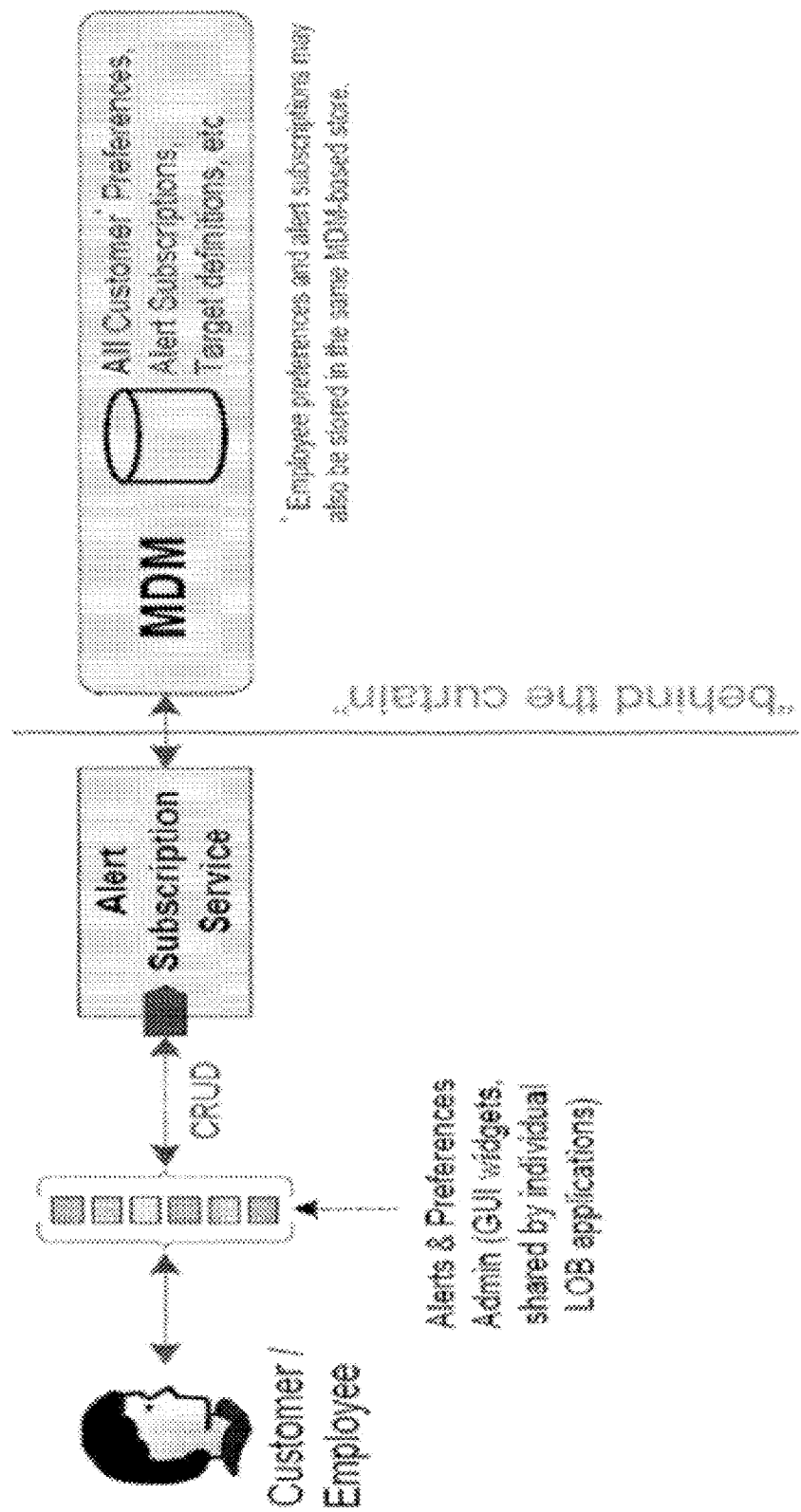
FIG. 9 illustrates a schematic diagram of an example alerting service, according to some embodiments.

FIG. 9 is a schematic diagram of an example architecture for an alert services system that provides management of Alert Subscriptions. As depicted, an alert subscription service can interface with a customer or employee/administrator as well as with an MDM unit, which can store all customer preferences, alert subscriptions, and target definitions.

Figure 10:
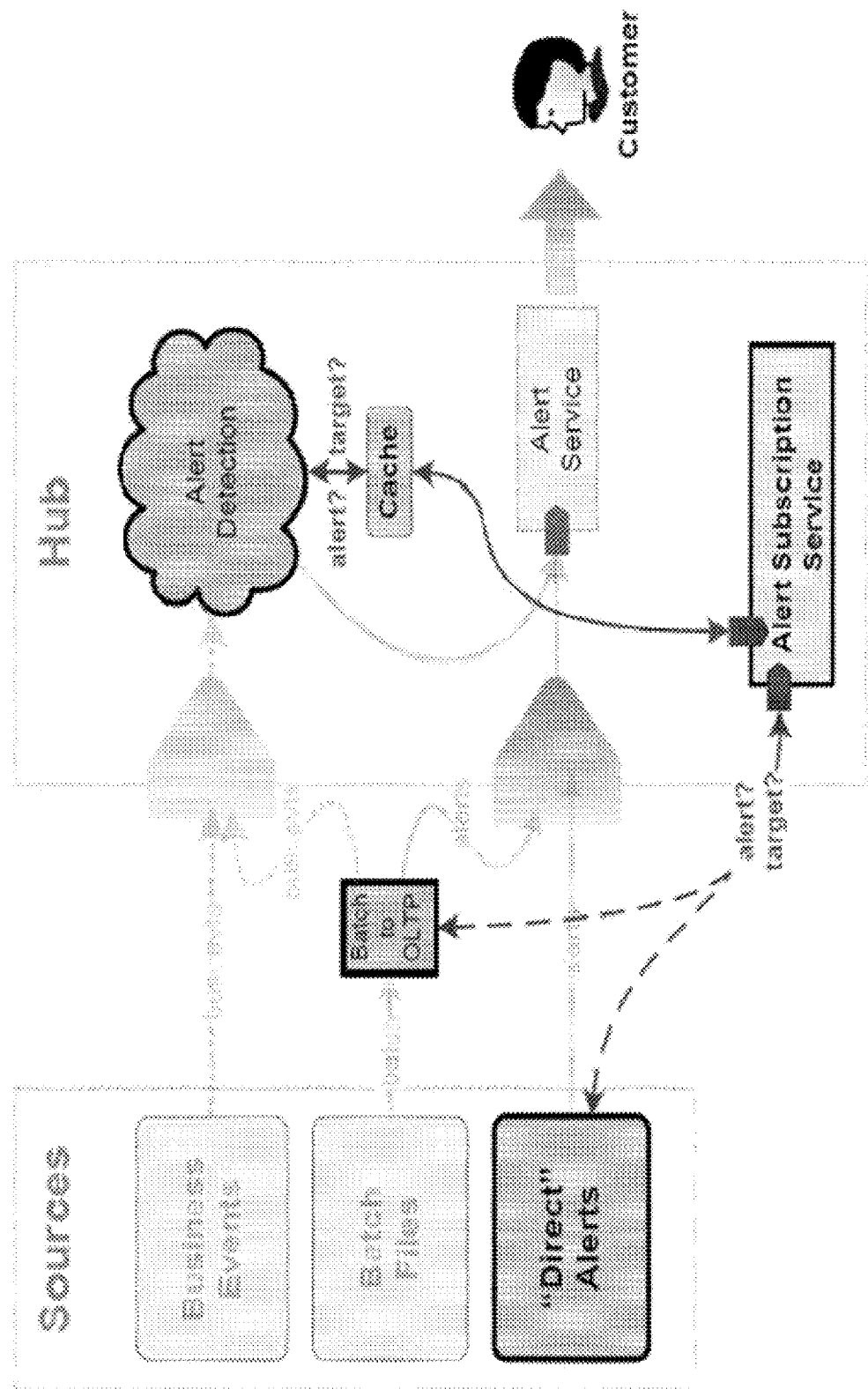
FIG. 10 illustrates a schematic diagram of an example alerting service system, according to some embodiments.

FIG. 10 is a schematic diagram of an example architecture for an alert subscription service. As depicted, the system can determine Alert Subscriptions at Runtime. The alert subscription service is configured to communicate with an alert detection unit, for example, involving a cache. The alert subscription service is configured to provide batch files to OLTP and to provide direct alerts to a direct alerts unit.

Figure 11:
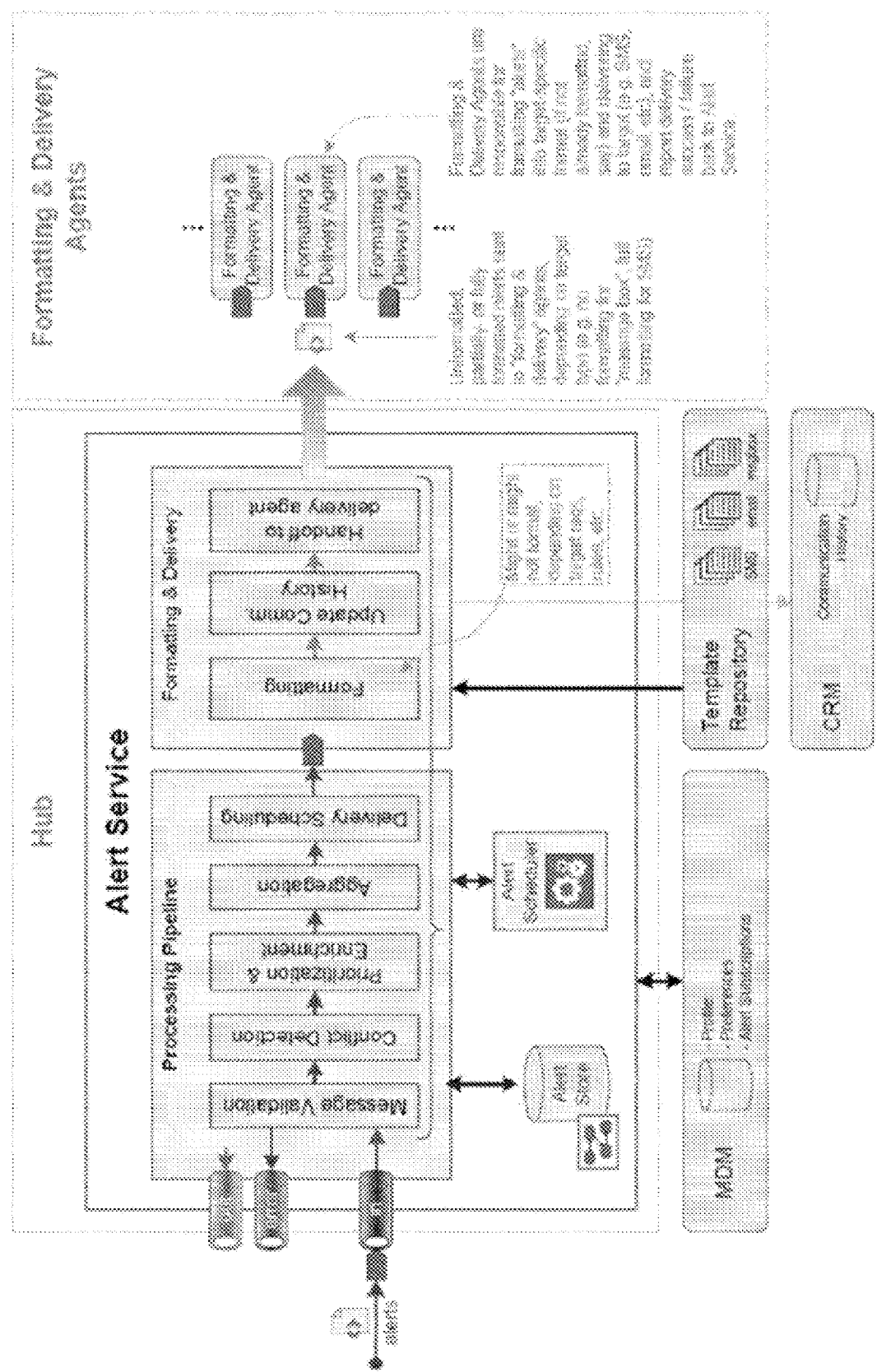
FIG. 11 illustrates a schematic diagram of an example alerting service system, according to some embodiments.

FIG. 11 is a schematic diagram of an example architecture implementing Pipeline, Formatting, and Delivery units for an alert services system. As depicted, a Hub can include an alert service, which can include a processing pipeline unit and a formatting and delivery unit. The alert service is configured to connect with a formatting and delivery agents unit, MDM unit, template repository, and CRM. The alert service can include an alert store as well as an alert scheduler; both units can transmit and receive data to the processing pipeline unit or any subcomponent. The processing pipeline unit is configured to provide various outputs and data, including error messages and outputs, as well as receive various inputs such as alert data.

Figure 12:
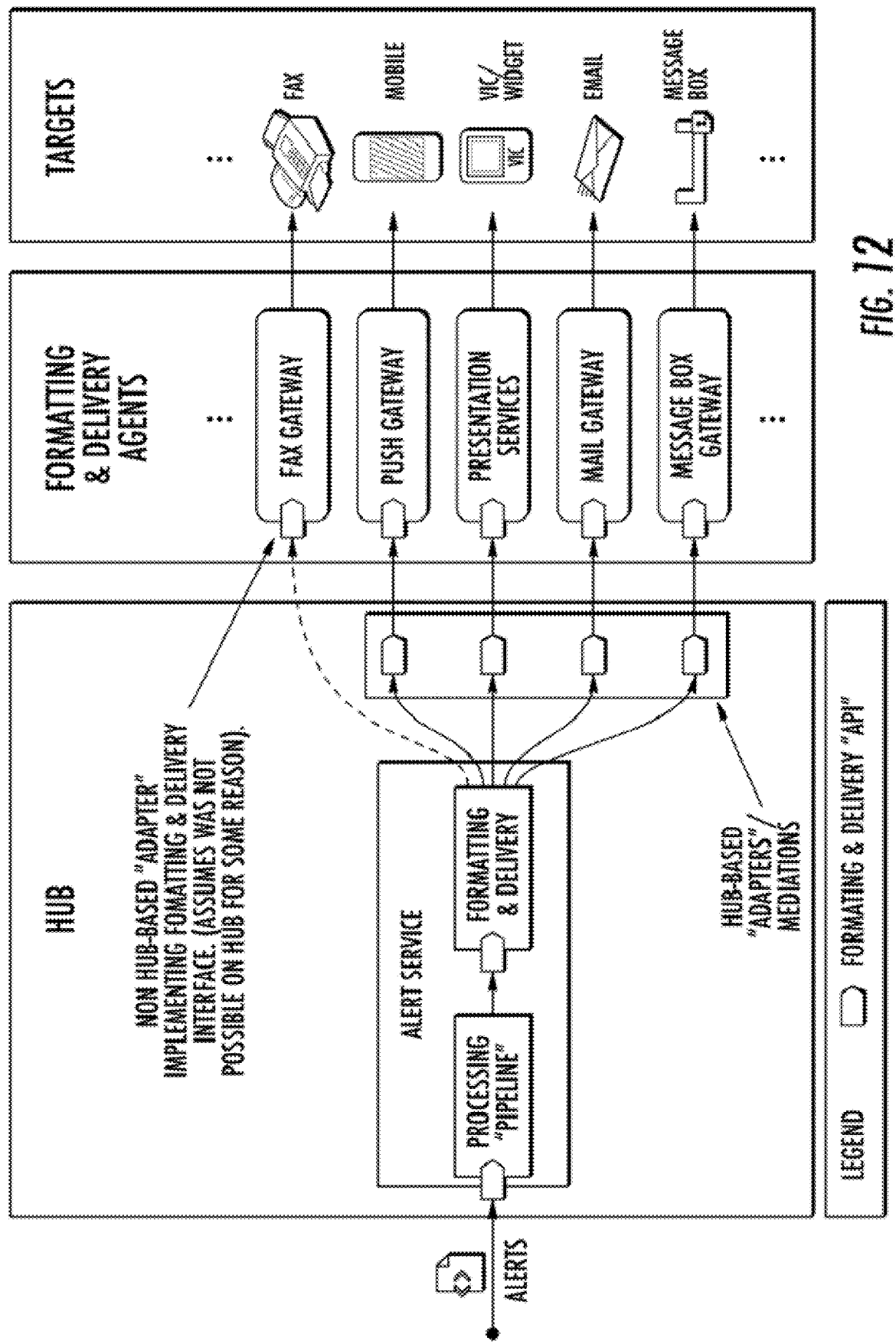
FIG. 12 illustrates a schematic diagram of an example alerting service system, according to some embodiments.

FIG. 12 is a schematic diagram of an example architecture of an alert services unit providing Hub-based Mediation to Formatting and Delivery Agents. As depicted, the alert services unit is configured to provide formatting and delivery outputs to a formatting and delivery agents unit using hub-based adapters or mediations. The alert services unit can also be configured to use a non-hub-based adapter implementing a formatting and delivery interface in some cases, for example, where a hub-based adapter is not possible.

Figure 13:
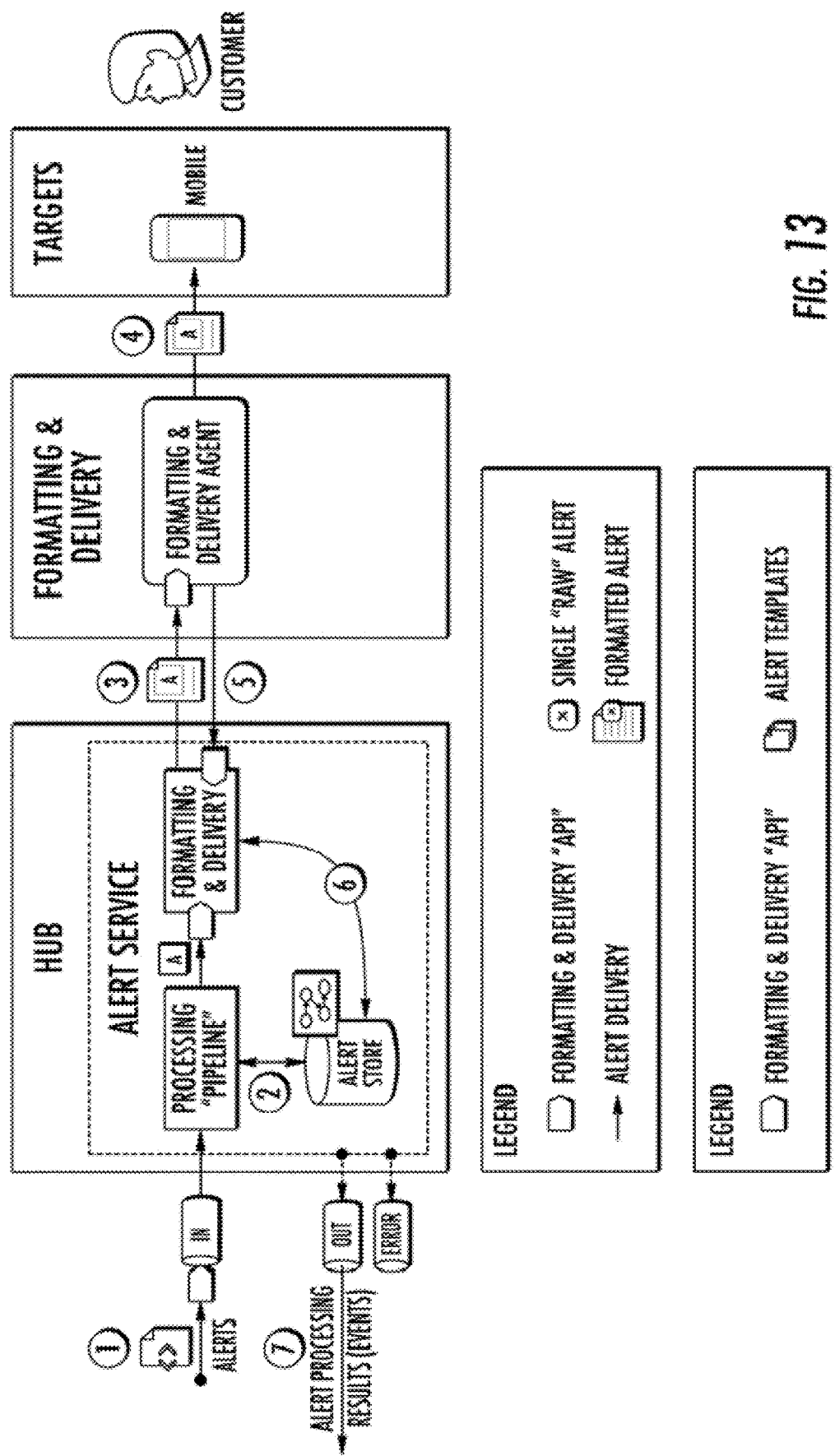
FIG. 13 illustrates a schematic diagram of an example alerting service system, according to some embodiments.

FIG. 13 is a schematic diagram of an example process of Delivery Reporting by an alert services unit. At 1, alert data is provided to an alert service unit. At 2, data is exchanged between an alert store and a processing pipeline unit included in the alert service unit. At 3, a formatted alert is provided to a formatting and delivery unit, including a formatting and delivery agent. At 4, a formatted alert is provided to a target unit, for example, a mobile phone of a customer. At 5, data is provided from the formatting and delivery agent to a formatting and delivery unit included in an alert service unit included in a hub. At 6, the formatting and delivery unit exchanges data with a data store. At 7, the alert services unit transmits alert processing results (events) data.

Example pseudocode in an example process for implementing actionable alerts in an alert services system follows.

An Alert Source generates an offer ("alert"), containing two "actions":

```
<alert>
    <type>SomeOrOtherOffer</type>
    <actions>
        <action id="accept"
            url="http://somemarketingsystem.bank.com/accept.jsp?offerid
```

```
=abc123d4"/>
    <action id="reject"
url="http://somemarketingsystem.bank.com/reject.jsp?offerid=abc123d4"/>
  </actions>
</alert>
```

The alert is sent to the Alert Service, which assigns it a UUID (d58ba2b2daf38f51f5, say). The Alert Service stores the original action URLs, keyed using the alert ID and an action ID, say. E.g. "accept"=1, "reject"=2.

```
d58ba2b2daf38f51f5, 1   ("accept")
  http://somemarketingsystem.bank.com/accept.jsp?offerid=abc123d4
d58ba2b2daf38f51f5, 2   ("reject")
  http://somemarketingsystem.bank.com/reject.jsp?offerid=abc123d4
```

The alert can be enriched by the Alert Service, which rewrites the action URLs as follows:

```
<alert>
  <type>SomeOrOtherOffer</type>
  ... (other data added by enrichment from profile, etc.)
  <actions>
    <action id="accept"
url="http://events.bank.com/handle.jsp?id=d58ba2b2daf38f51f5_1"/>
    <action id="reject"
url="http://events.bank.com/handle.jsp?id=d58ba2b2daf38f51f5_2"/>
  </actions>
</alert>
```

When a URL is clicked, Alert Service's Action Handler (e.g. a web-application) can receive the a notification of a "click", extracts alert ID, action ID, records the customer's response, and redirects to the original URL (as stored in the enriched alert).

Figure 14:
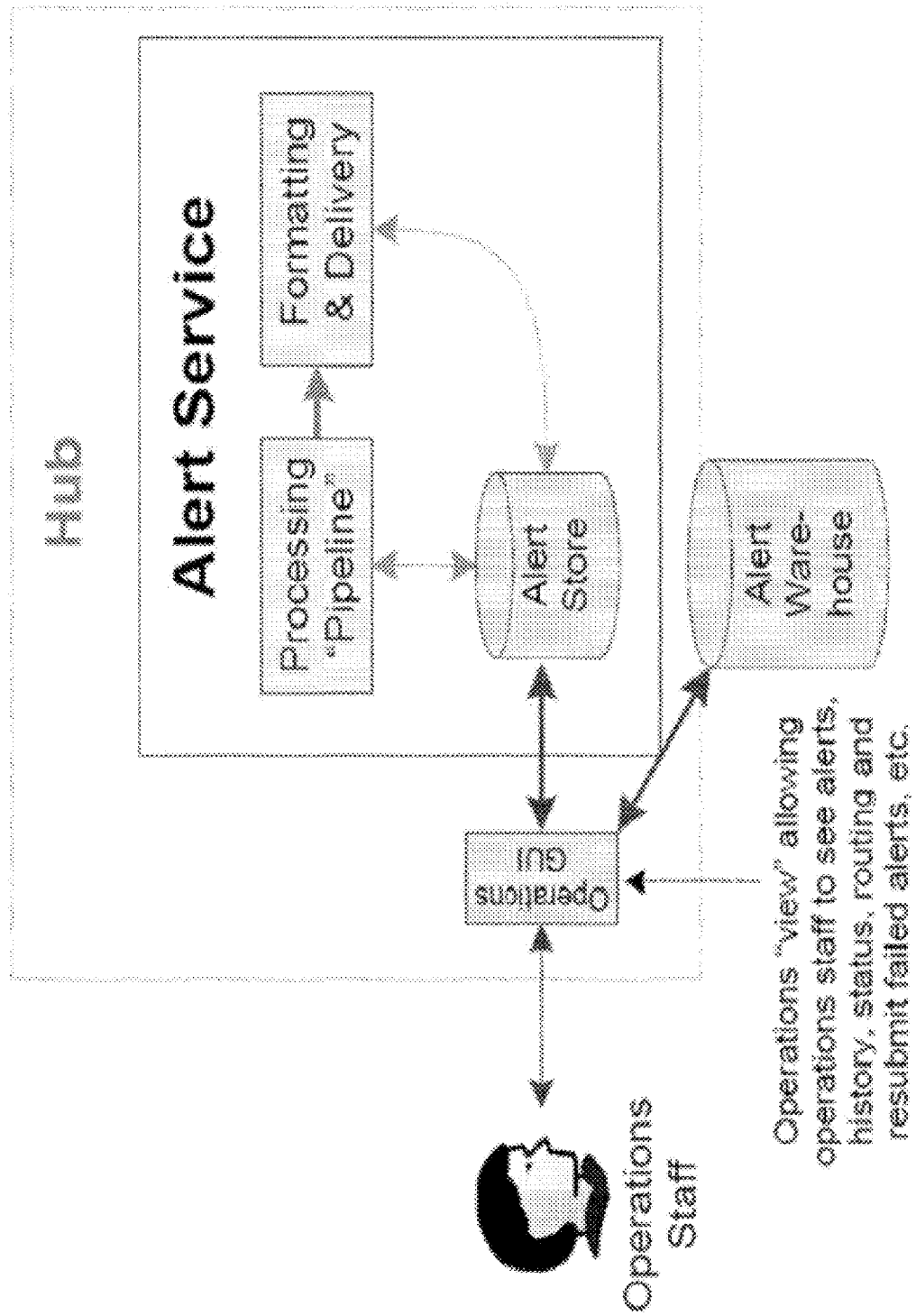
FIG. 14 illustrates a schematic diagram of an example alerting service system, according to some embodiments.

FIG. 14 is a schematic diagram of an example architecture for an alert services system for providing Operational Support. As depicted, the Alert Services is included as part of a Hub architecture and itself includes a processing pipeline unit and a formatting and delivery unit, each of which are configured to exchange data with an alert store. The alert store is configured to exchange data with an operations GUI unit, which is configured to exchange data with an alert warehouse as well as operations units that can be used by operations staff. The operations GUI unit, for example, provisions GUI interface elements viewable in an operations view arrangement, where operations staff can view and interact with alerts, history, status, routing, and resubmissions for failed alerts, etc.

Figure 15:
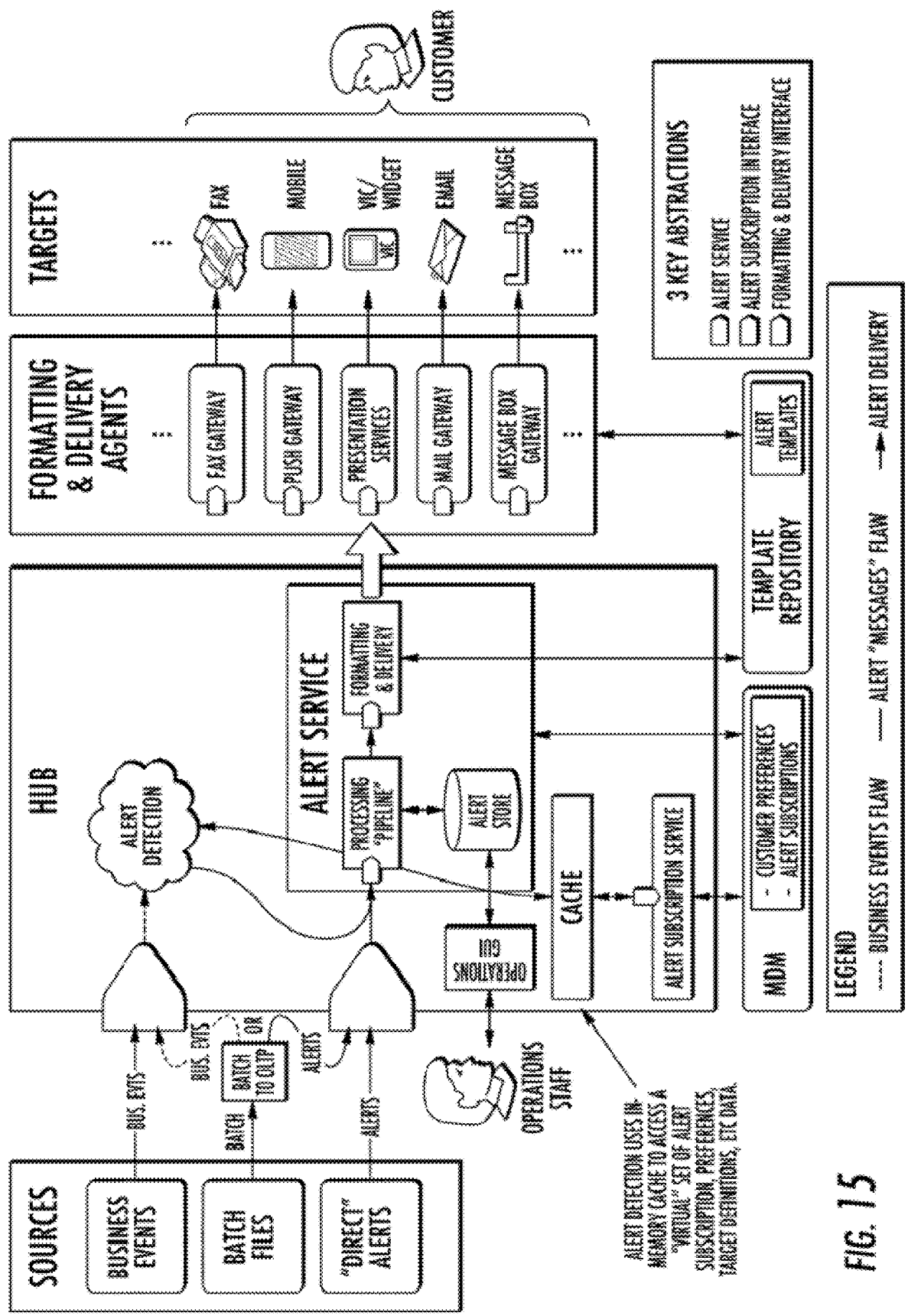
FIG. 15 illustrates a schematic diagram of an example alerting service system, according to some embodiments.

FIG. 15 is a schematic diagram of an example architecture for an alert services system. The alert services system includes source units, a hub (including an alert service unit), formatting and delivery agents and units, and targets. These units can interact with each other, exchanging data, as depicted.

Figure 16:
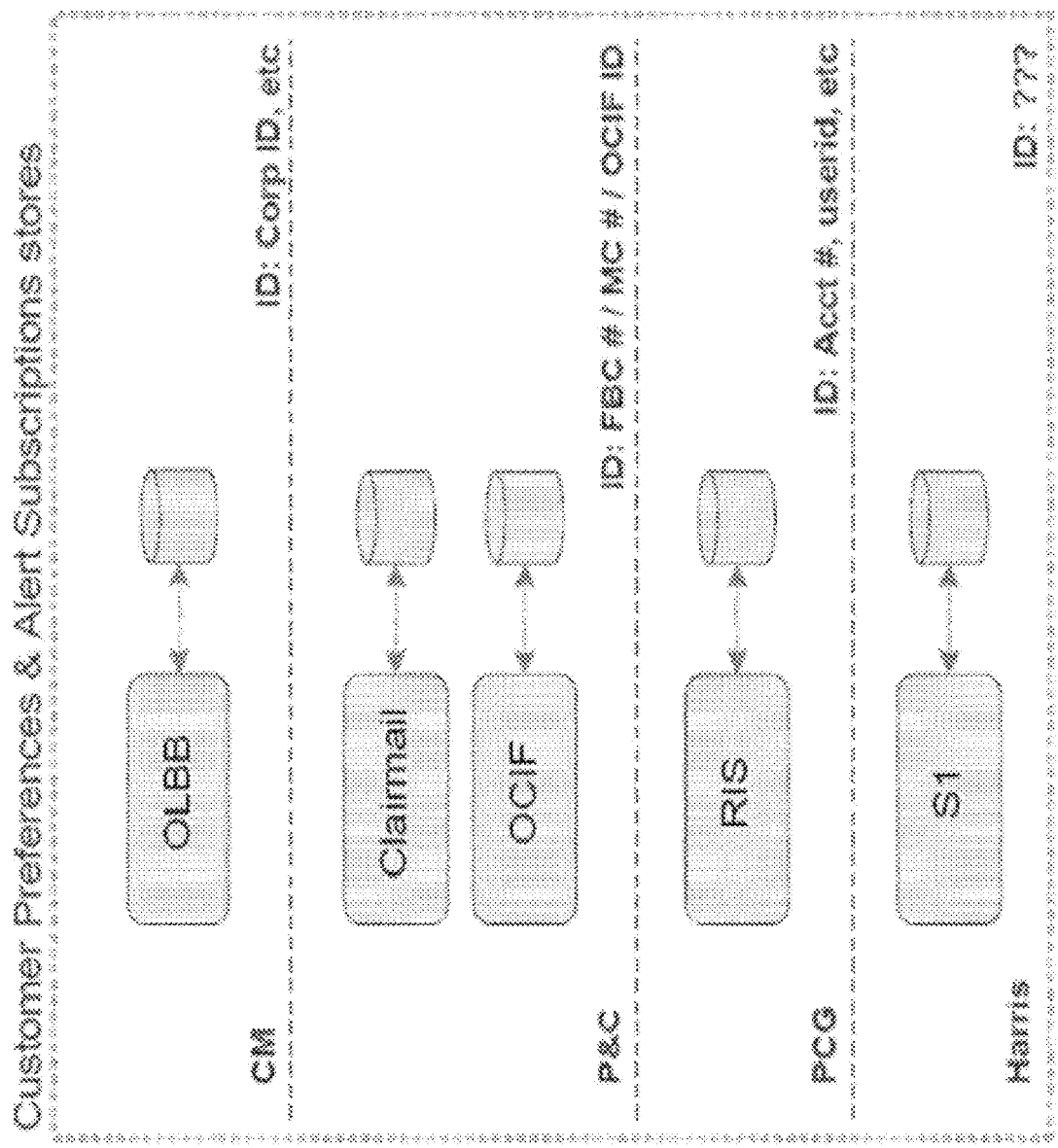
FIG. 16 illustrates a schematic diagram of an example alerting service system, according to some embodiments.

FIG. 16 is a schematic diagram of an example architecture for an alert services system illustrating an example problem in a Migration: Alert Subscriptions context. The alert services system can include the depicted customer preferences and alert subscriptions stores corresponding to different customers.

Figure 17:
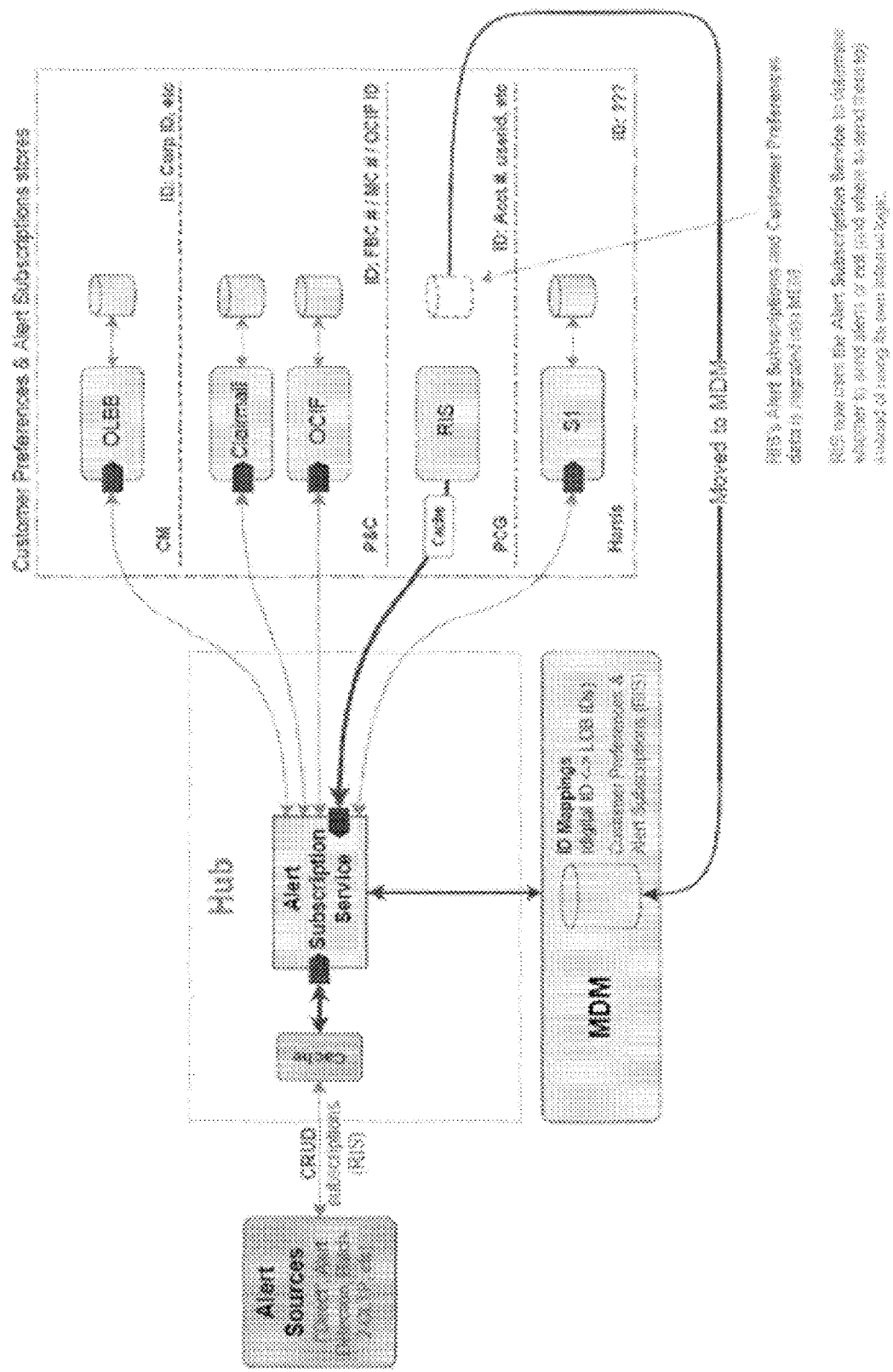
FIG. 17 illustrates a schematic diagram of an example alerting service system, according to some embodiments.

FIG. 17 is a schematic diagram of an example architecture for an alert services system illustrating an example Alert Subscriptions Migration architecture implementing another example "Scatter-Gather" architecture. As depicted, as an example, retail investment service (RIS) alert subscriptions and customer preferences data is migrated from a storage unit at a customer preferences and alert subscriptions store into MDM. RIS can now use the alert subscription service to determine whether to send alerts or not (and where to send them to) instead of using its own internal logic.

Figure 18:
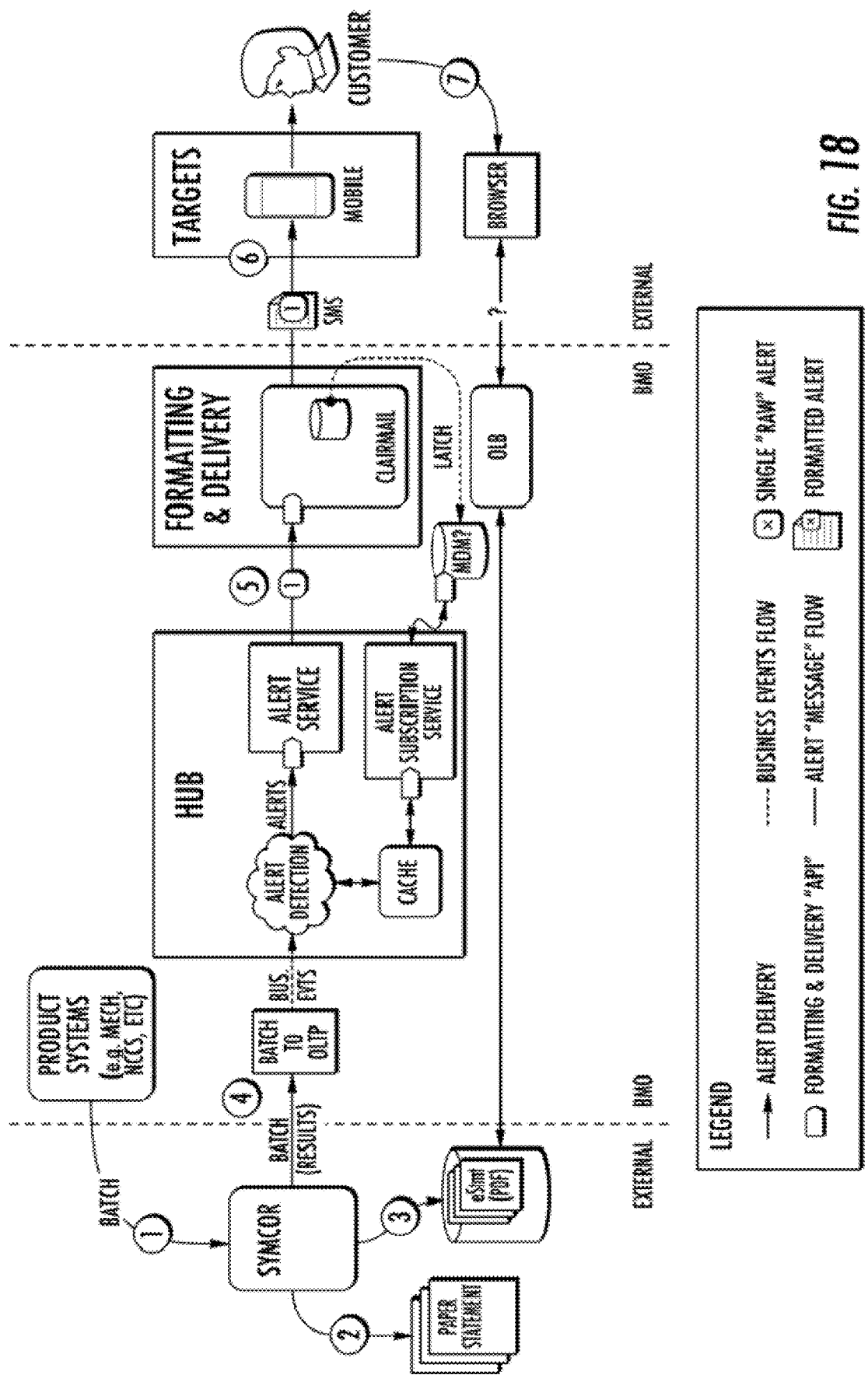
FIG. 18 illustrates a schematic diagram of an example alerting service system, according to some embodiments.

FIG. 18 is a schematic diagram of a use case of an example alert services system. As depicted, the alert services system is configured to provide eStatement Notifications. At 1, product systems can provide batch data to a financial institution (FI) unit, for example. At 2, the FI unit is configured to provide paper statements. At 3, the FI unit is configured to provide eStatements (e.g. PDFs). At 4, the FI unit is configured to provide batch results to OLTP. At 5, an alert service unit within a Hub is configured to provide an alert to a formatting and delivery unit. At 6, the formatting and delivery unit is configured to provide data to a target. At 7, a customer unit is configured to provide data to a browser.

Figure 19:
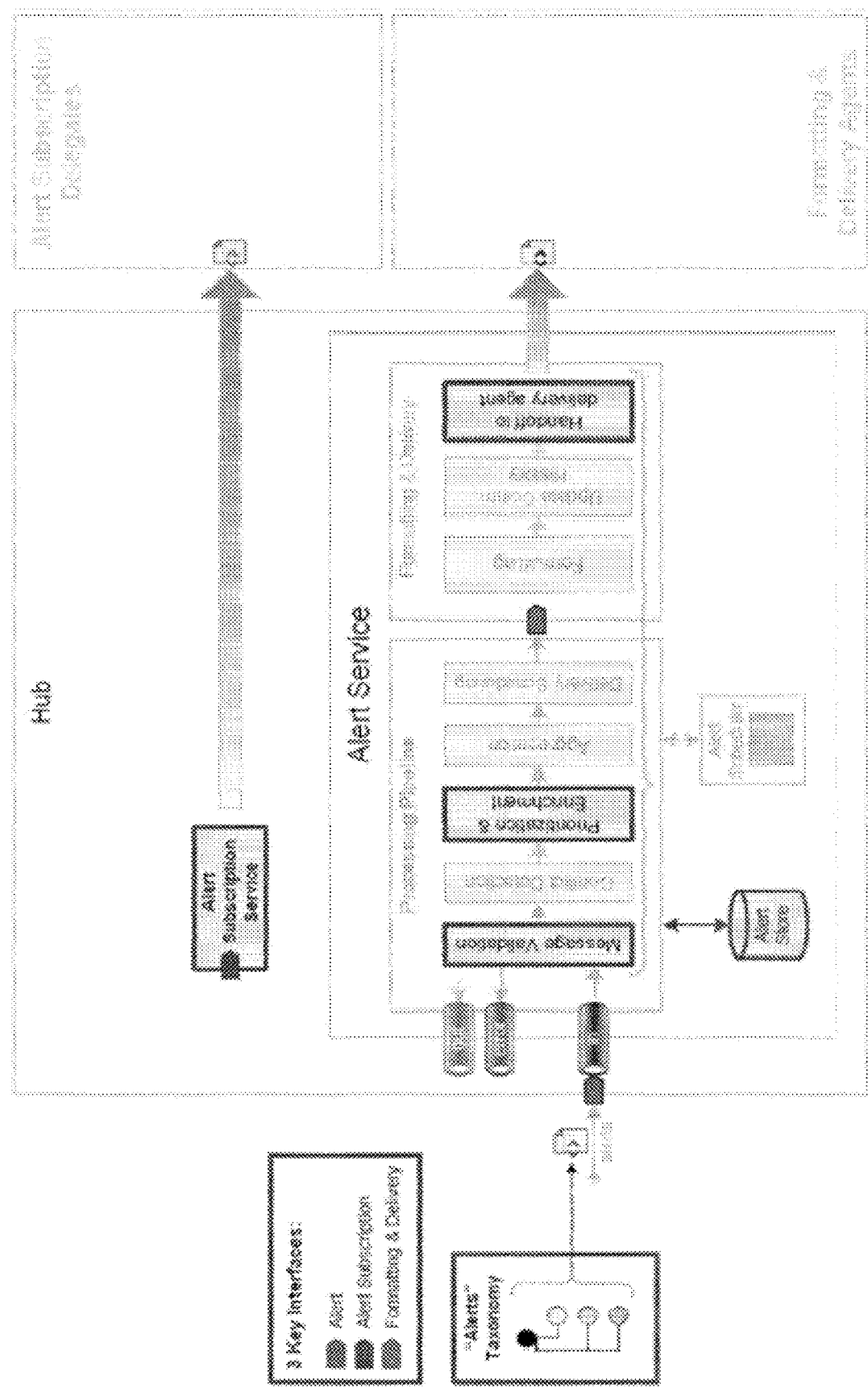
FIG. 19 illustrates a schematic diagram of an example alerting service system, according to some embodiments.

FIG. 19 is a schematic diagram of an example phased rollout of an Alert Service.

Figure 20:
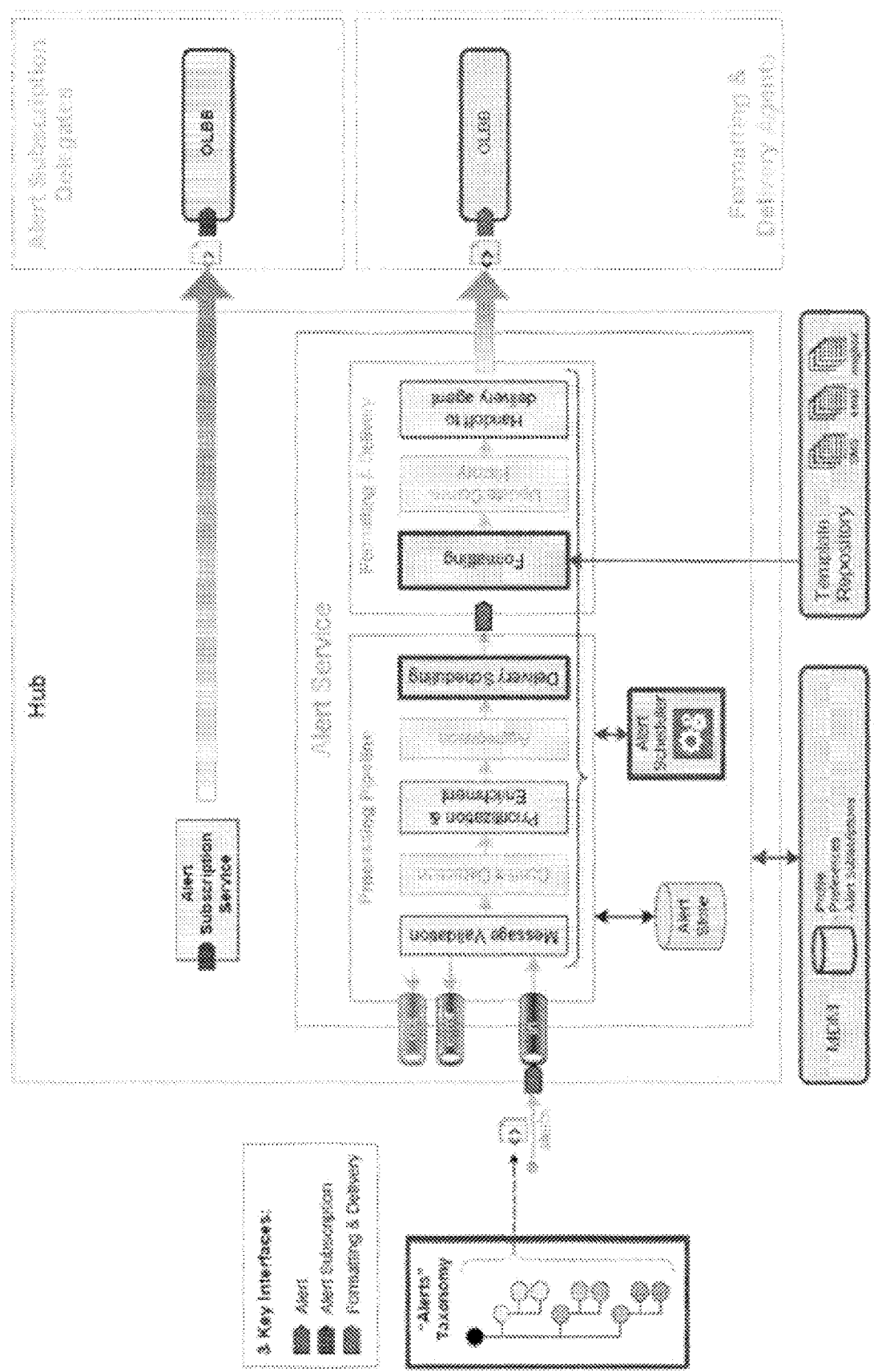
FIG. 20 illustrates a schematic diagram of an example alerting service system, according to some embodiments.

FIG. 20 is a schematic diagram of an example phased rollout of an Alert Service.

Figure 21:
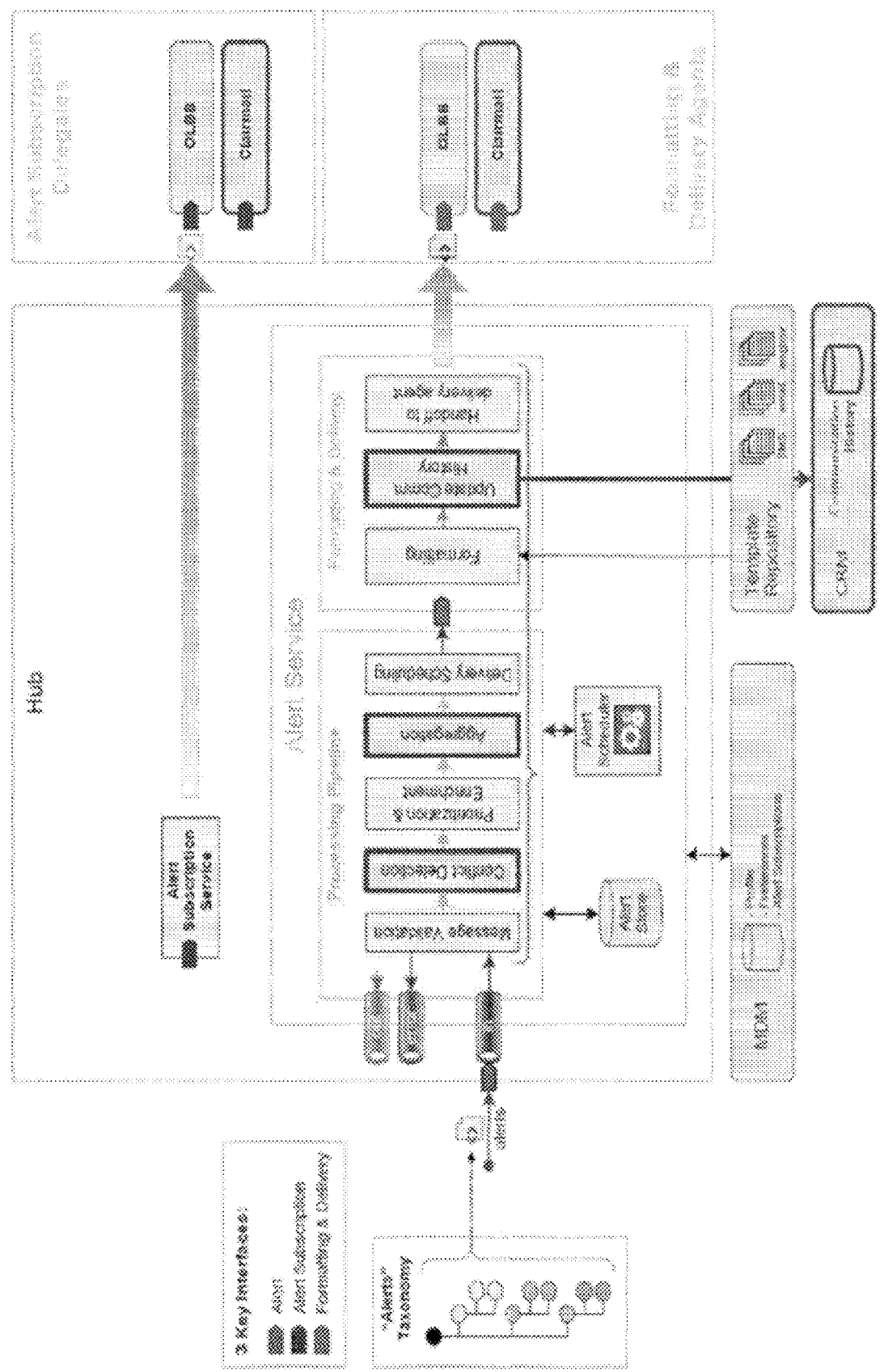
FIG. 21 illustrates a schematic diagram of an example alerting service system, according to some embodiments.

FIG. 21 is a schematic diagram of an example phased rollout of an Alert Service.

Figure 22:
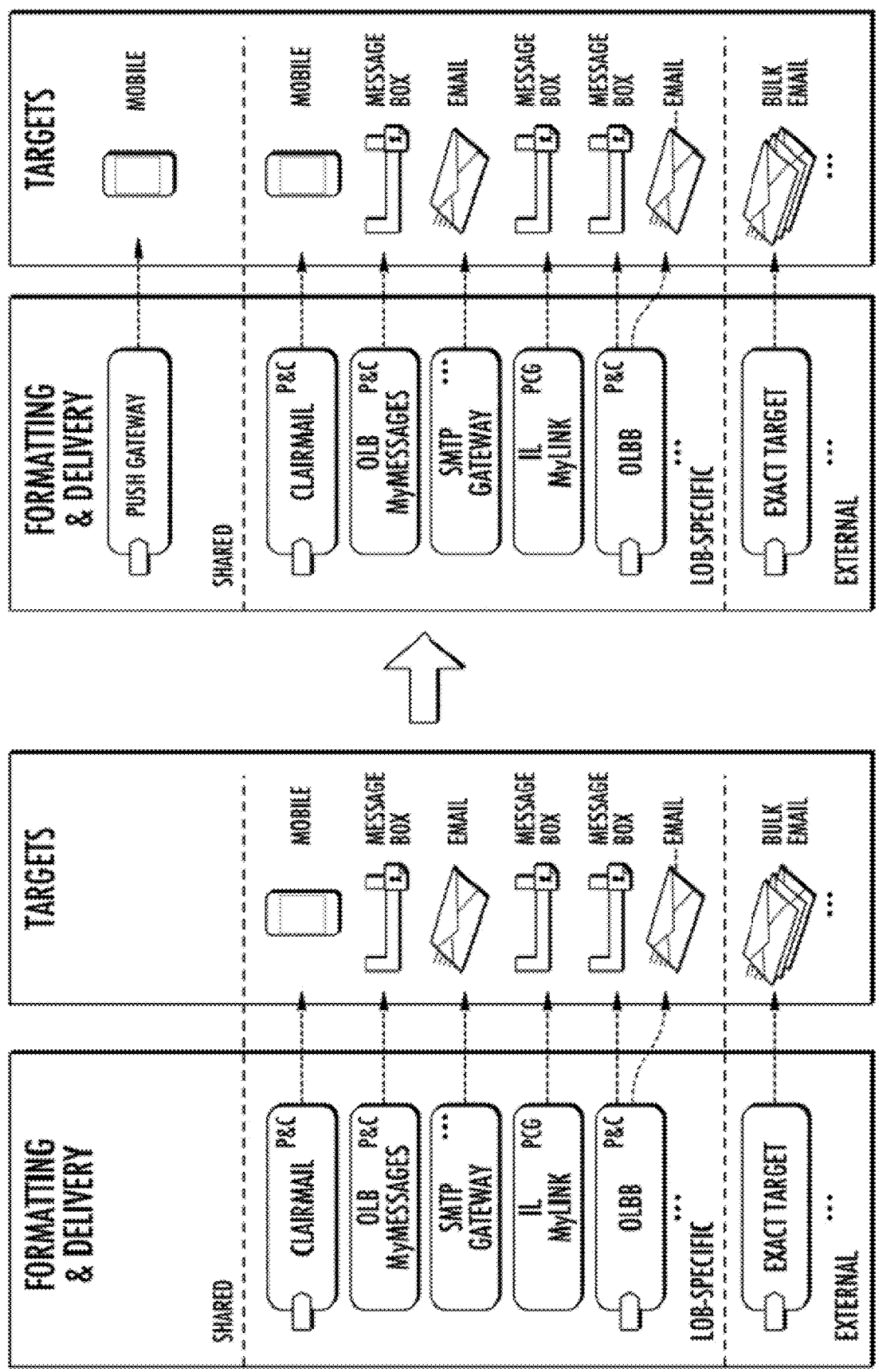
FIG. 22 illustrates a schematic diagram of an example alerting service system, according to some embodiments.

FIG. 22 is a schematic diagram of an example phased rollout of a Formatting and Delivery service.

Figure 23:
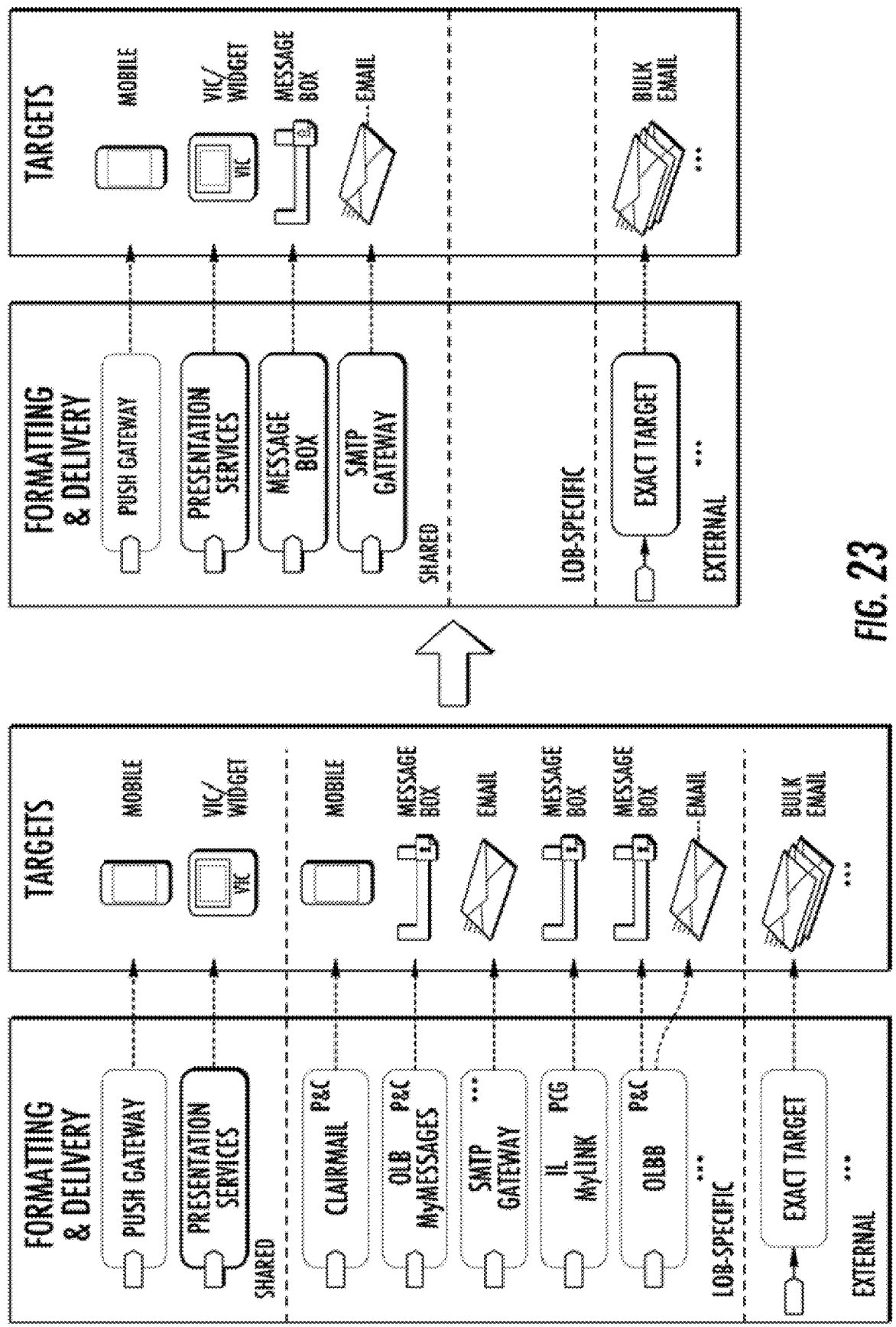
FIG. 23 illustrates a schematic diagram of an example alerting service system, according to some embodiments.

FIG. 23 is a schematic diagram of another example phased rollout of a Formatting and Delivery service.

Figure 24:
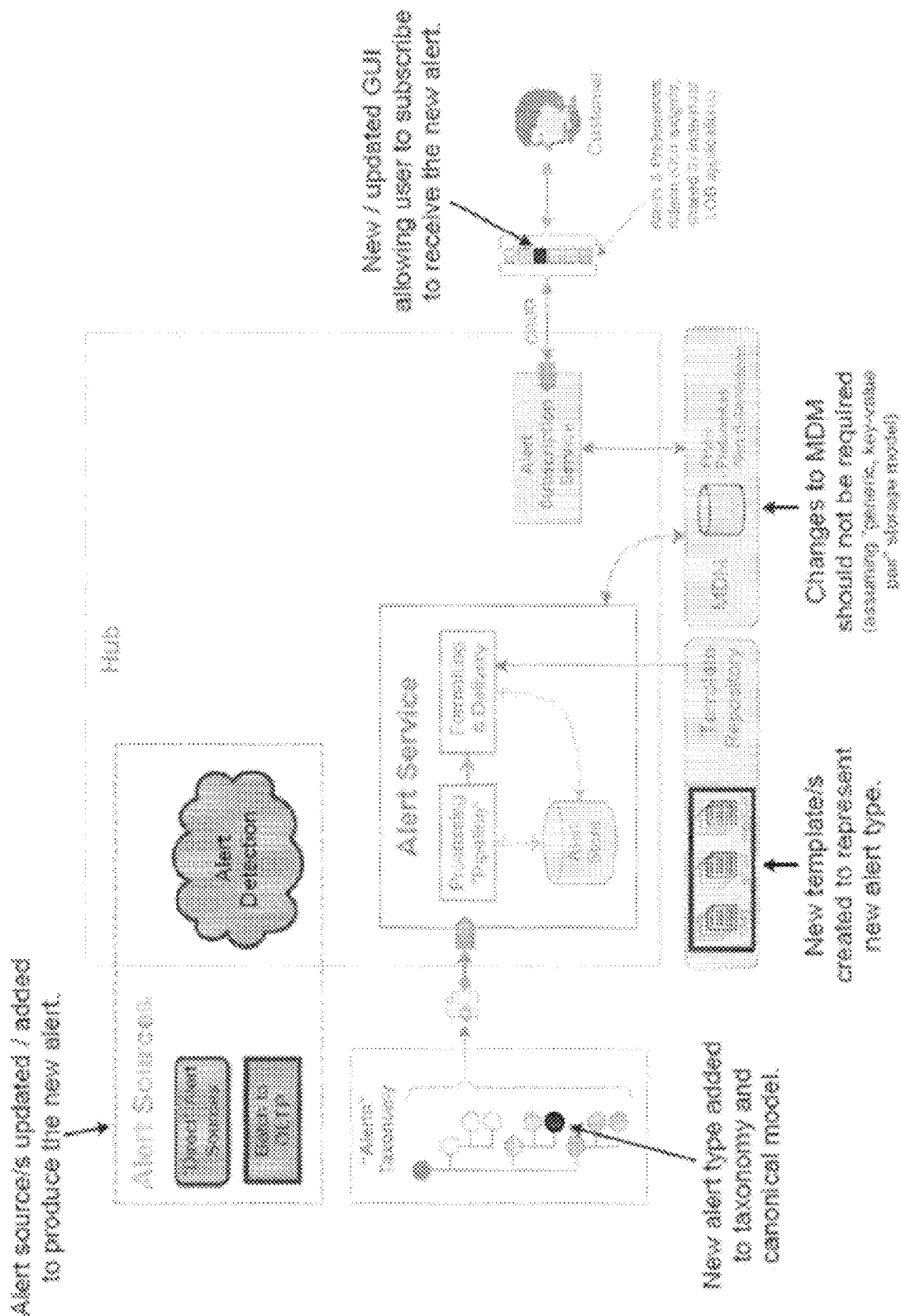
FIG. 24 illustrates a schematic diagram of an example alerting service system, according to some embodiments.

FIG. 24 is a schematic diagram of an example maintenance process in an alert service system, specifically, adding a new Alert Type.

Figure 25:
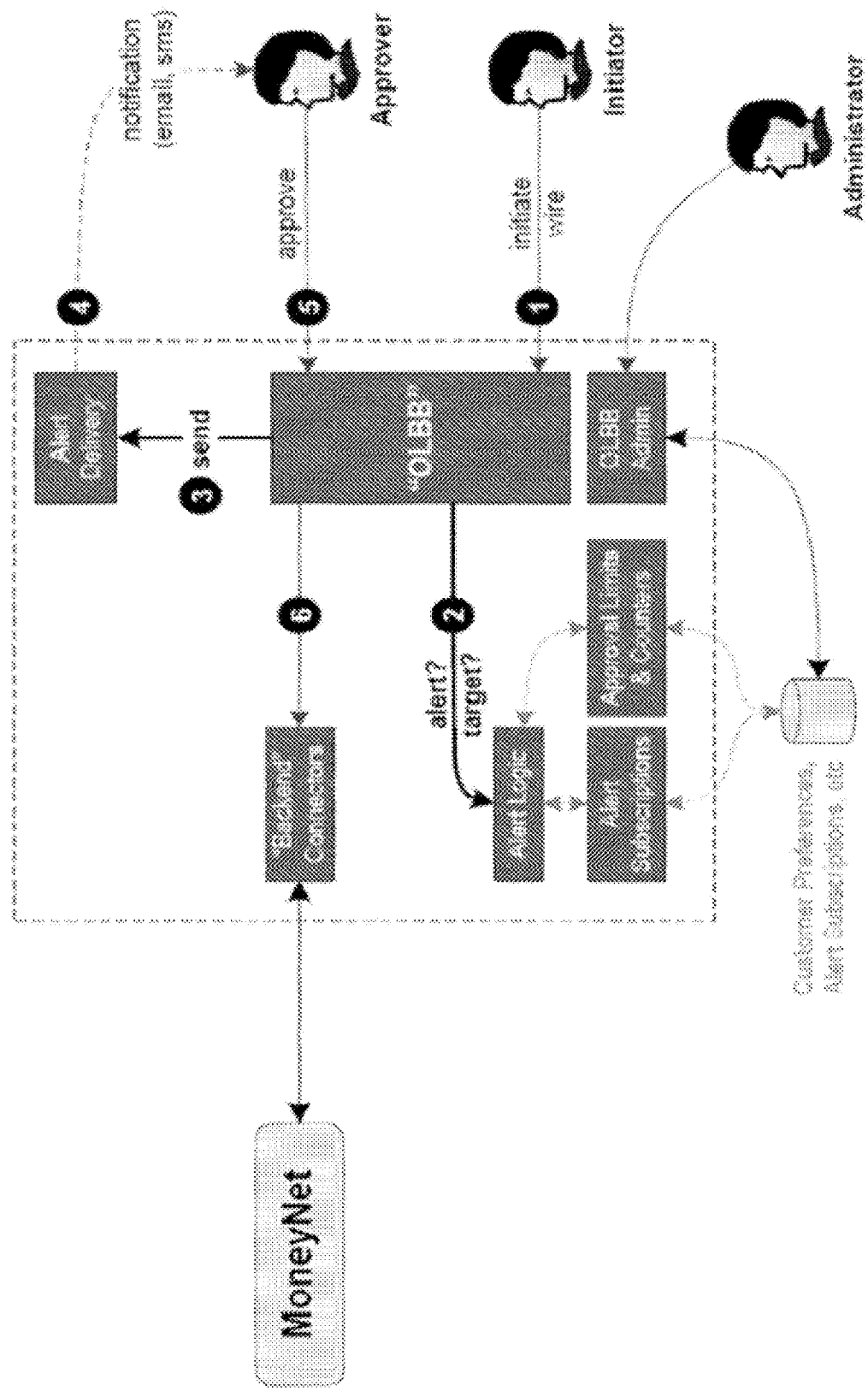
FIG. 25 illustrates a schematic diagram of an example alerting service system, according to some embodiments.

FIG. 25 is a schematic diagram of a use case of an example alert service system, integrated with an online banking for business unit (OLBB). At 1, an initiator unit transmits an initiation to an OLBB unit. At 2, the OLBB unit transmits data to an alert logic unit. At 3, the OLBB unit sends data to an alert delivery unit. At 4, the alert delivery unit sends a notification to an approver unit. At 5, the approver unit transmits approval data to the OLBB unit. At 6, the OLBB unit transmits data to backend connectors.

Figure 26:
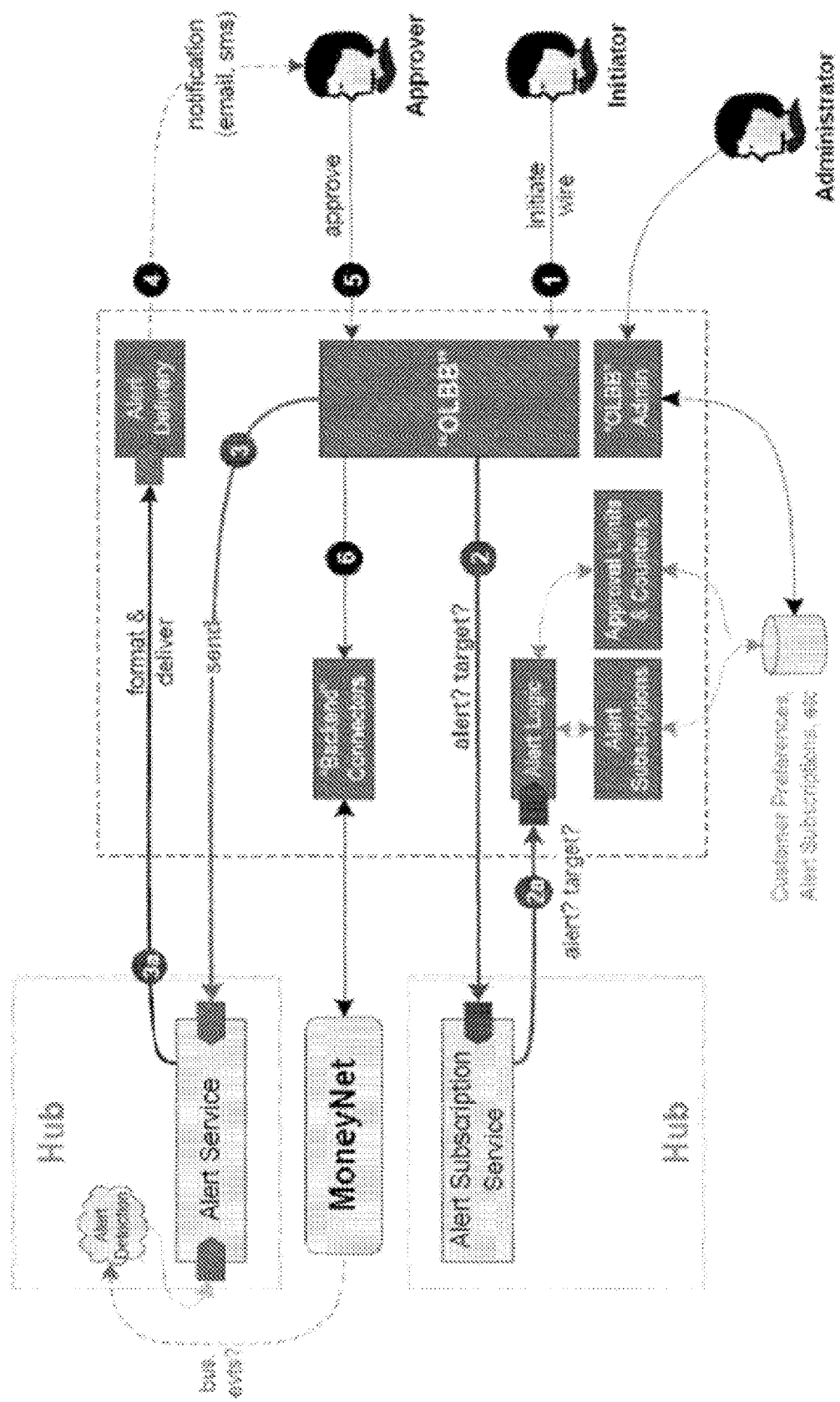
FIG. 26 illustrates a schematic diagram of an example alerting service system, according to some embodiments.

FIG. 26 is a schematic diagram of a use case of an alert service system, OLBB Migration. At 1, an initiator unit transmits an initiation to an OLBB unit. At 2, the OLBB unit transmits data to an alert subscription service unit included as part of a Hub. At 2A, the alert subscription service unit transmits data to an alert logic unit. At 3, the OLBB unit transmits data to an Alert Service unit included in a second Hub. At 3A, the alert Service unit transmits data to an alert delivery unit. At 4, the alert delivery unit transmits a notification to an approver unit, which transmits data, at 5, to the OLBB unit. At 6, the OLBB unit transmits data to backend connectors.

Alert Delivery Service can provide a uniform enterprise-wide "alerts" (outbound, electronic customer-communication) Management and Delivery Framework; provide an LOB-agnostic mechanism for delivery of outbound electronic messages to customers (and employees); enable delivery of "alerts" (notifications, offers and alerts) to multiple target types (such as SMS, email, fax, etc.) and support the addition of both new "alert" types as well as new target types (e.g. OLB Message Box, etc.); specify an enterprise-wide "alerts" taxonomy and canonical model; provide an easy migration path for existing systems, allowing current technology investments to be leveraged and migrated over time towards a shared-services model; enable customers to manage communication preferences and "alert subscriptions" in a unified and coherent manner; provide a platform to enable reuse and cross-LOB sharing and enable technical agility (that is, allow technology investments to be rationalized incrementally and with minimal "lock in"); and align with the bank's (or other organization) enterprise architecture standards and patterns.

Figure 27:
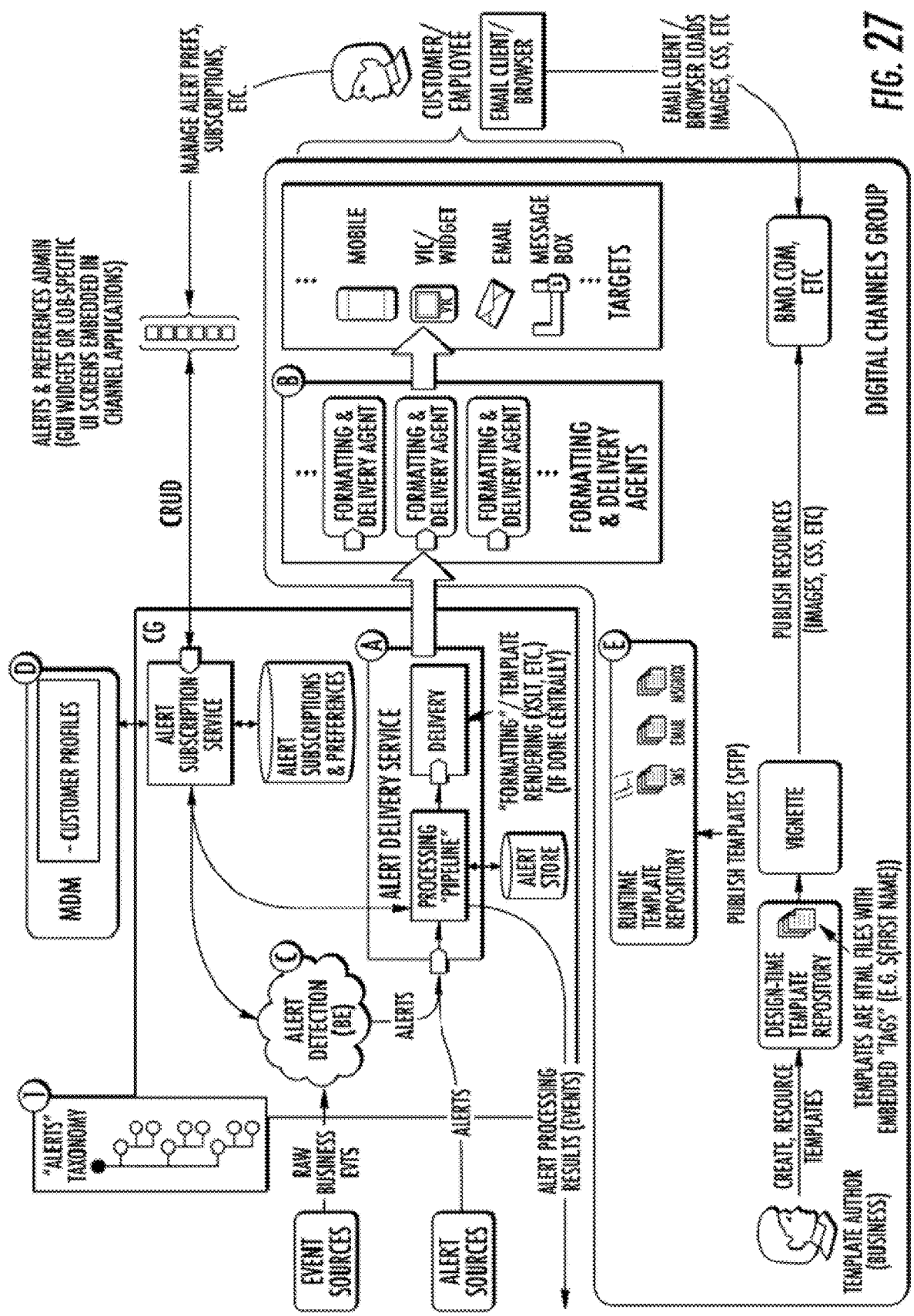
FIG. 27 illustrates a schematic diagram of an example architecture for an alert service system, according to some embodiments.

FIG. 27 is a schematic diagram of an example architecture for an Alert Delivery Service. As depicted, this architecture includes an Alerts Taxonomy Unit, Alert Delivery Service Unit, Formatting and Delivery Agent, Alert Detection unit, Runtime Template Repository, and Customer Communication Preferences Unit.

The Alerts Taxonomy is a "catalog" (Excel, Word, etc.) defining the various "alerts" that the Alert Delivery Service (ADS) that can be sent via the ADS. Each entry in the catalog specifies the alert type (e.g. SignficantDepositAlert) along with key-value pairs that provide actual alert content.

The Alert Delivery Service Unit is the core CG-based web-service that accepts alert "messages" and arranges for their actual delivery to customers, based on customer preferences.

The Formatting and Delivery Agent is an agent/system (e.g. in some embodiments, represented internally within CG via a proxy/adapter) that is capable of (optionally) formatting & delivering "alert" messages to customers.

The Alert Detection Unit provides a Hub-based complex-event-processing (CEP) capability that "monitors" incoming business events and generates appropriate "alerts" should they be warranted.

The Runtime Template Repository allows in cases where the ADS is configured to "format" alert messages (that is, create a human-readable message from an XML alert payload), for the ADS to use simple business-defined templates stored in a "runtime template repository" to create the human-readable messages.

The Customer Communication Preferences Unit stores or manages Customer preferences, as well as "subscriptions" (indicating the desire to be alerted when certain conditions are met, such as low account balance, etc.) stored in local alert engine data repository but soft linked to the ECIF customer profile.

Figure 28:
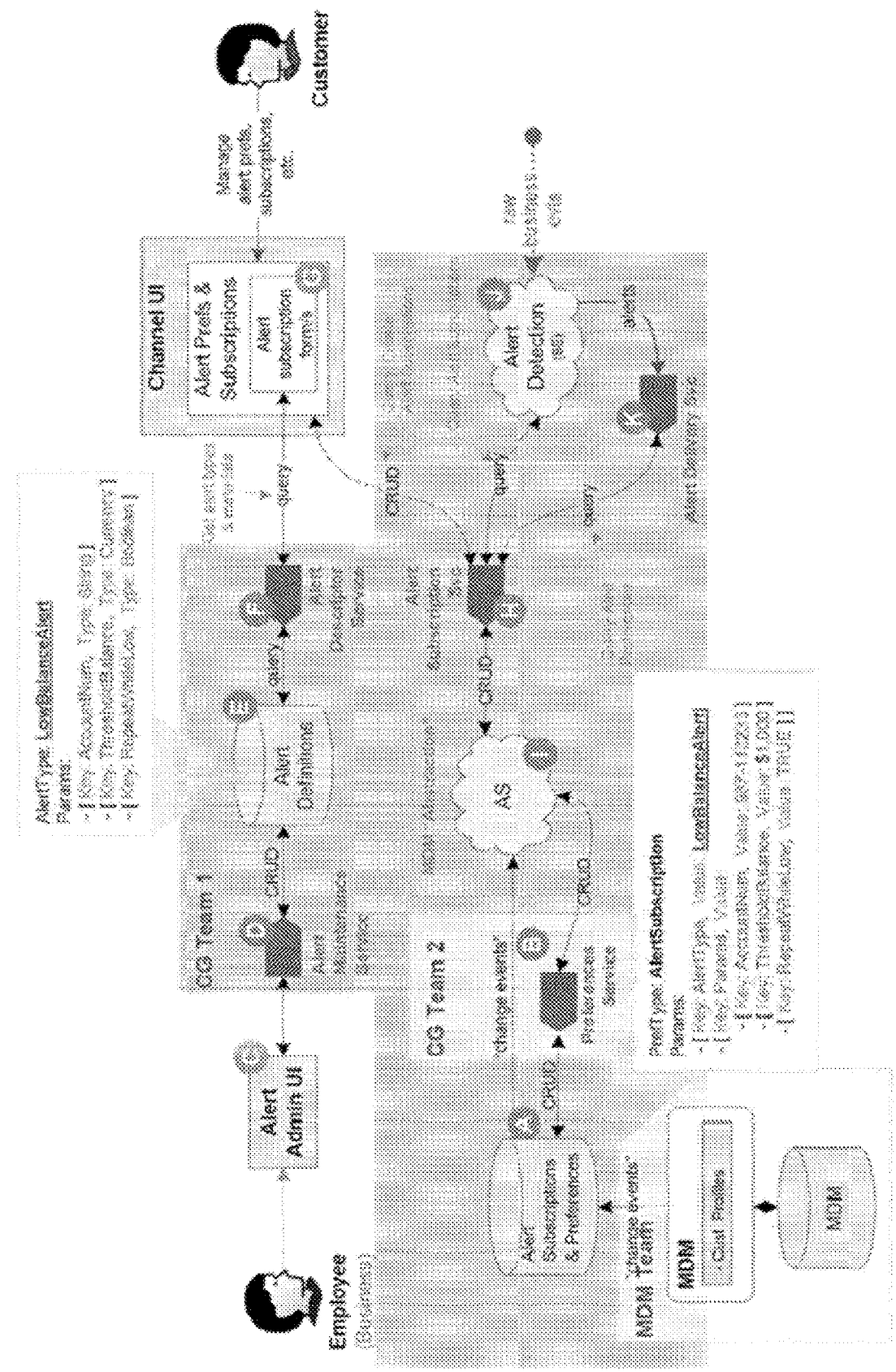
FIG. 28 illustrates a schematic diagram of an example architecture for an alert service system, according to some embodiments.

FIG. 28 is a schematic diagram of example components and development ownership for Alerts.

Figure 29:
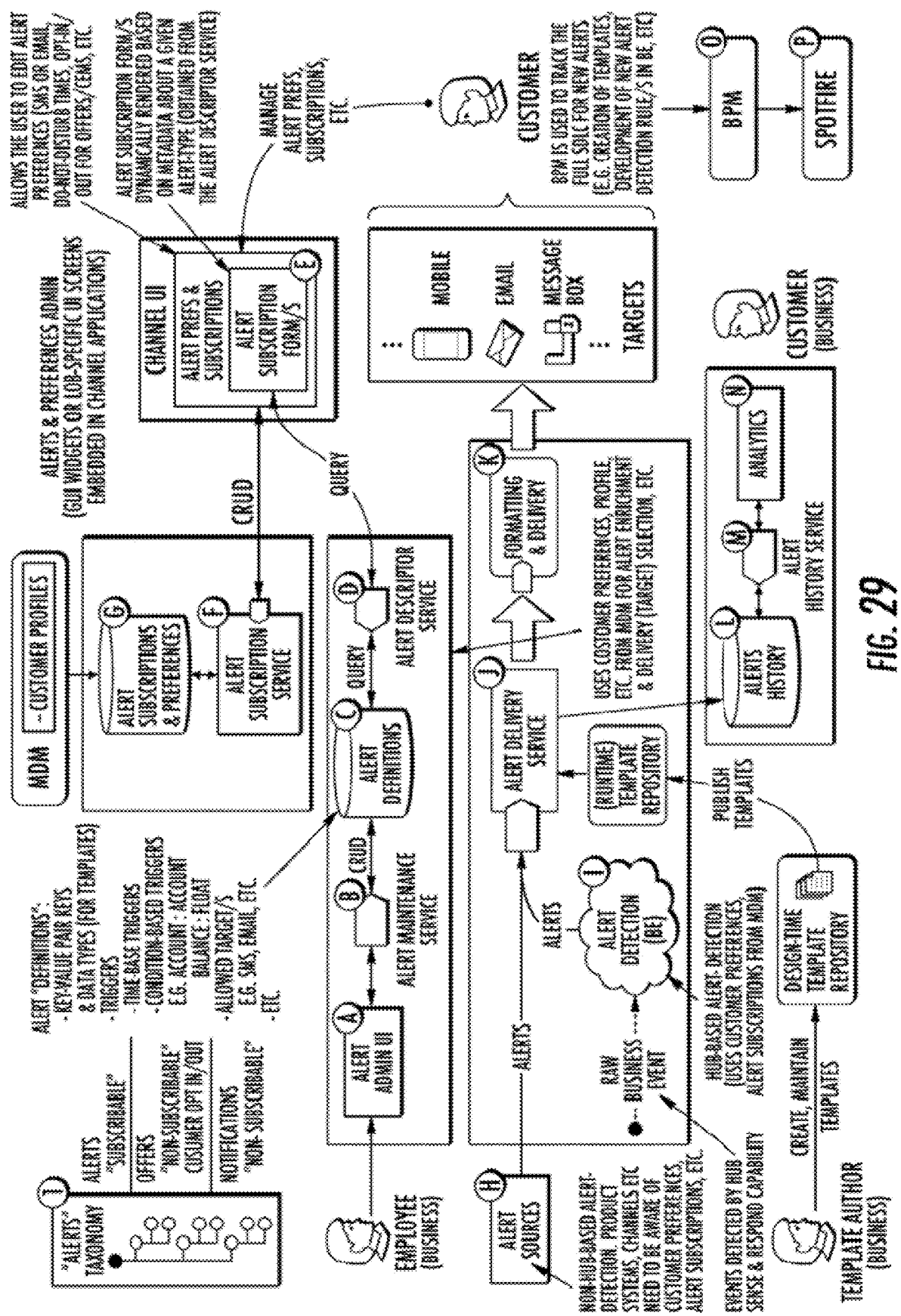
FIG. 29 illustrates a schematic diagram of an example architecture for an alert service system, according to some embodiments.

FIG. 29 is a schematic diagram of alert "SDLC" components for an Alert Delivery Service.

Figure 30:
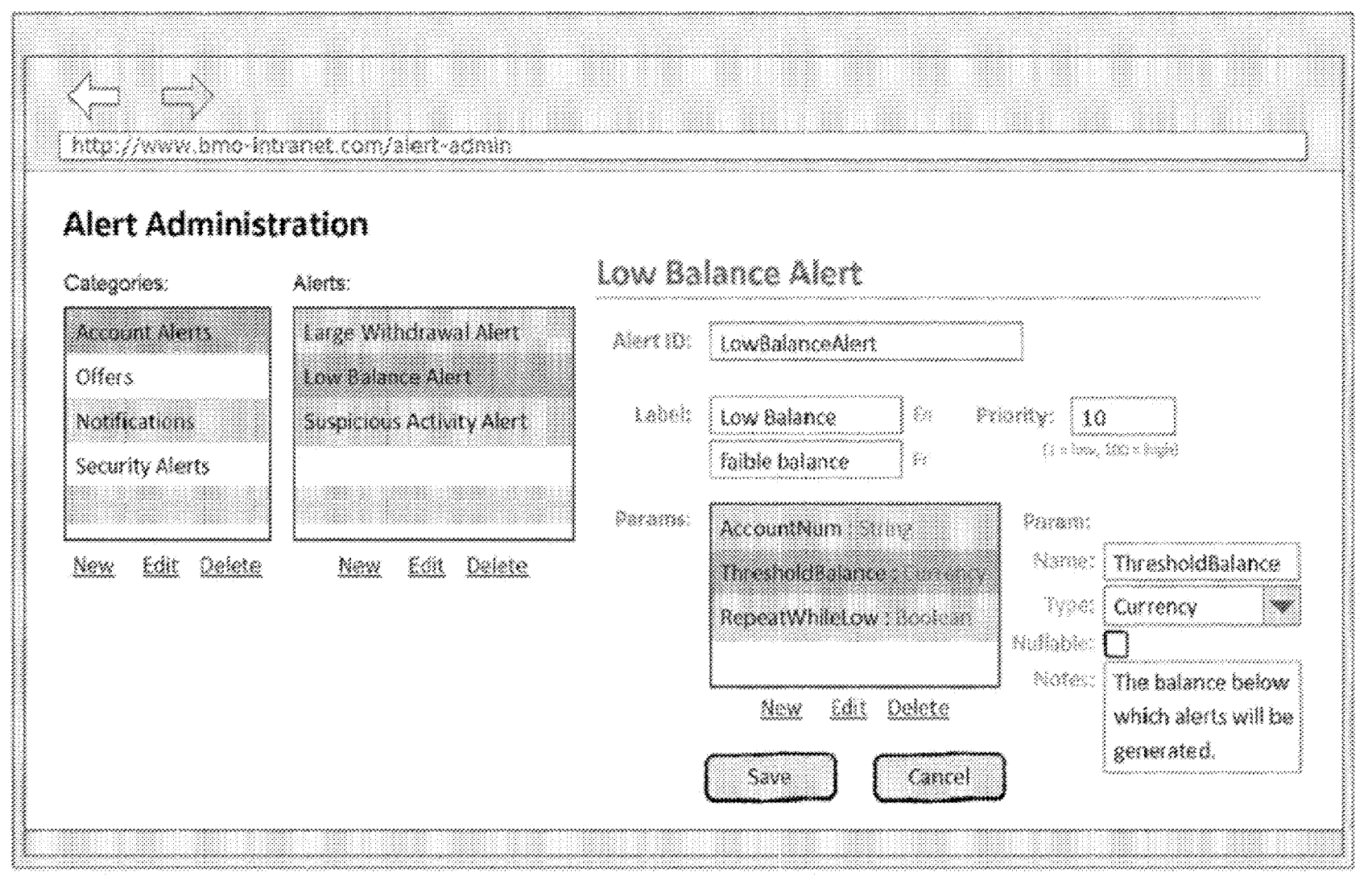

FIG. 30 is a schematic diagram of an example UI mockup (alert admin) for an Alert Delivery Service. As depicted, various interface elements can be arranged to improve and enable functionality and engagement.

FIG. 31 is a schematic diagram of an example UI mockup (alert subscription) for an Alert Delivery Service. As depicted, various interface elements can be arranged to improve and enable functionality and engagement.

Figure 32:
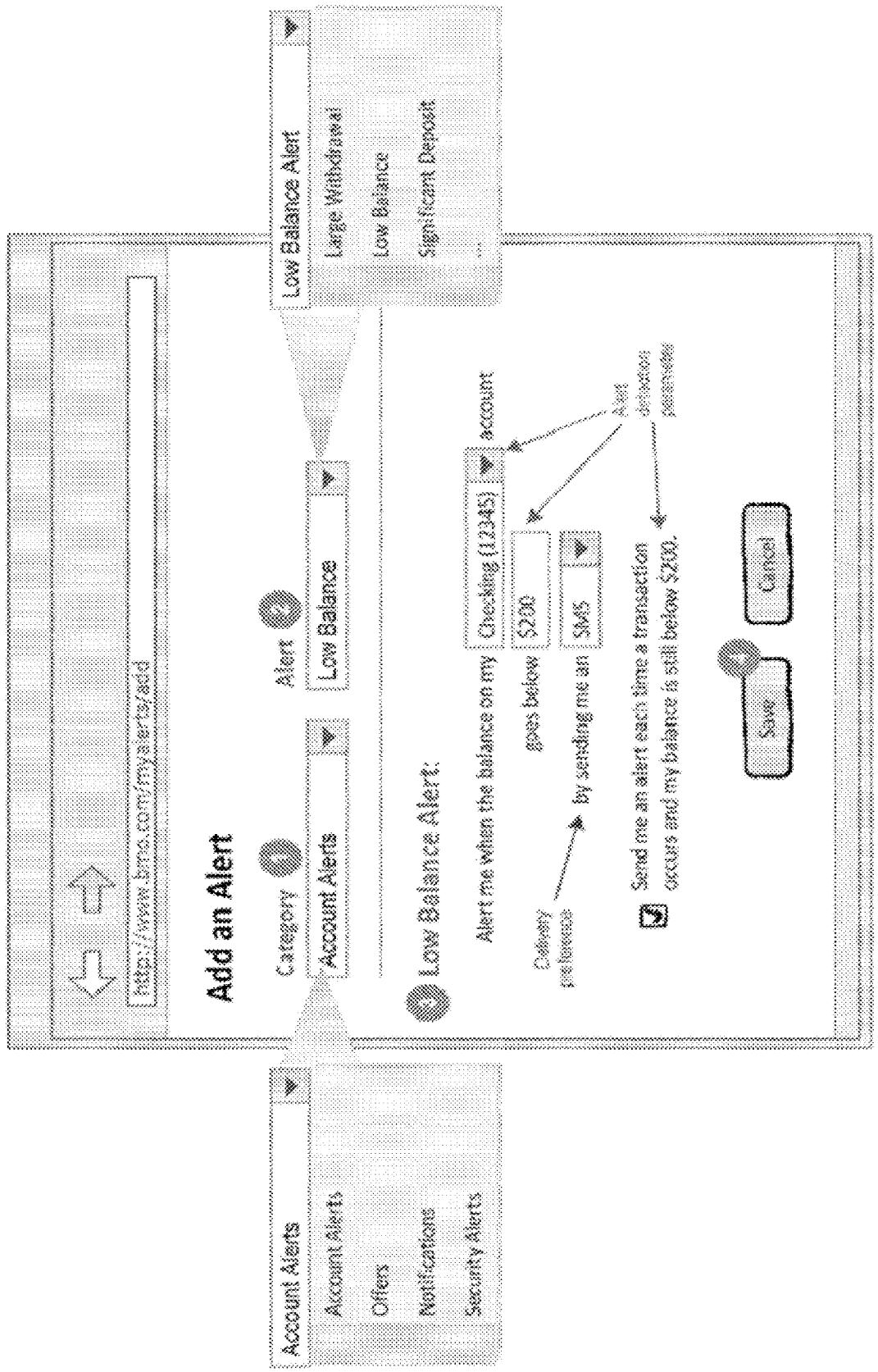
FIG. 32 illustrates a schematic diagram of an example interface for an alert service system, according to some embodiments.

FIG. 32 is a schematic diagram of an example UI mockup (alert subscription) for an Alert Delivery Service. As depicted, various interface elements can be arranged to improve and enable functionality and engagement.

The following describes various components of an example process for creating a new alert in an Alert Delivery Service: Alert software development life cycle.

Business users use an Alert Admin UI (A) to edit/add new alerts to the catalog of alerts "known by" the Alert Delivery Service. For each alert, users define:
  Alert ID (e.g. SignficantDepositAlert, PasswordChangeAlert, FailedLoginAlert, etc.)
  Alert-data keys and associated types (e.g. [AccountID, integer], [Balance, float], [TxnDate, date], etc.
  Template-data keys and associated types (e.g. [FirstName, string], [LastName, string], [AccountName, string], etc.
  Alert template/s
    Name of the template (typically the same as the Alert ID)
    Supported target types (e.g. SMS, Email, etc.) for this particular alert
  Alert Trigger/s
    Value-based triggers (e.g. Account Balance<threshold, AccountID, etc.)
    Time-based triggers (e.g. date-time)

The Alert Admin UI uses the Alert Maintenance Service to store data in an Alert Definitions DB. A new workflow is started in BPM to track the enablement of the new alert (e.g. creation of suitable templates, development of alert-detection rule/s in BE—assuming Hub-based detection, etc.)

The BPM workflow is used to drive (and track) the end-to-end rollout of the new alert.

Status of new and in-development alerts can be tracked.

The following describes various components of an example Alert Subscription process of an Alert Delivery Service according to some embodiments.

A customer subscribes to alerts by using a channel-provided Alerts Preferences & Subscriptions UI. The UI queries an Alert Descriptor Service which reads from the Alert Definitions DB to obtain metadata about available alerts (e.g. alert ID, English/French label, alert type, associated trigger/s, supported target type/s, etc.) and renders an appropriate form (based on the alert metadata). The user provides values for alert triggers (such as Account ID, Balance Threshold) and target/s (e.g. Email, SMS) creating an "alert subscription". The Alert Prefs and Subscriptions UI (E) uses the Alert Subscription Service to write the customer's "alert subscription" into AE data store.

The following describes various components of an example Alert Generation process of an Alert Delivery Service according to some embodiments.

In some embodiments, at runtime, alerts are generated in one of two ways, Hub-Based Alert Detection and Non-Hub-Based Alert Detection.

In Hub-based Alert Detection, each customer's alert subscriptions and preferences, stored in AE data store (G), are made available to Alert Detection in the base of Hub-based alert-detection—likely via ActiveSpaces or VCI. Business events from various product systems are intercepted by the Hub's Sense and Respond capability and are passed to "alert detection rule-set/s" (I) within the Hub (likely based on Business Events). "Alert detection rule-set/s" detect when the conditions ("triggers") specified in a given alert subscription are met and generate appropriate alerts, which are sent to the Alert Delivery Service for delivery.

In Non-Hub-based Alert Detection, Alert Sources which might be channels, product systems, etc.—need knowledge of a customer's alert subscriptions. They can obtain this information either by replicating customer alert subscriptions and preferences from AE data store or by using the Alert Subscription Service. Alert Sources then use logic to "detect" conditions warranting alerts and generate the appropriate alert XML messages, which are sent to the Alert Delivery Service for delivery.

The following describes various components of an example Alert History & Analytics feature of an alert delivery service, according to some embodiments. Each alert that is processed by the Alert Delivery Service is recorded in an Alerts History datastore, allowing alert usage, trends, etc. to be analyzed. Analytics applications can either directly access the Alerts History datastore, or can access data about a given customer's alert history via the Alert History Service.

Figure 33:
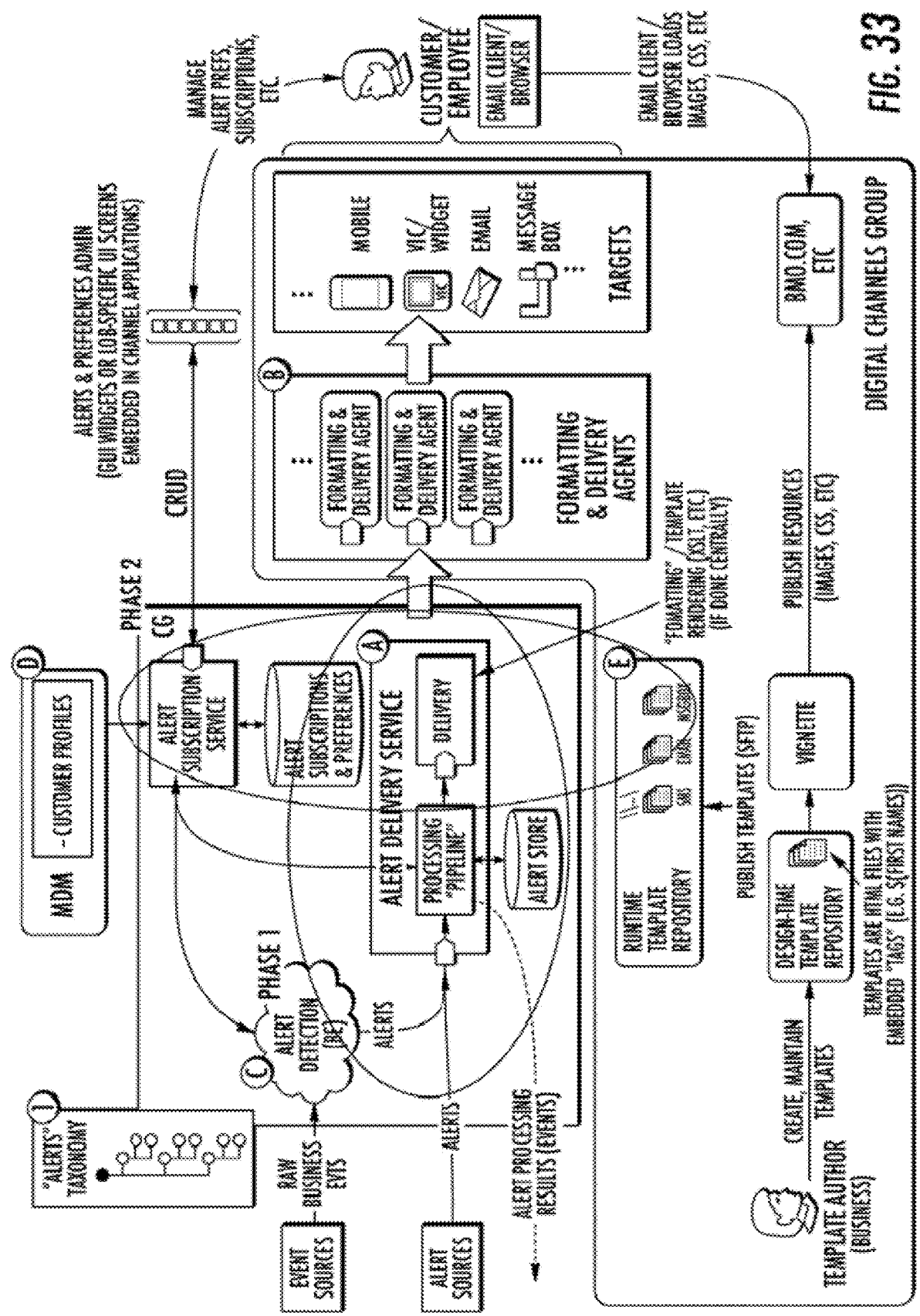
FIG. 33 illustrates a schematic diagram of an example alerting service system, according to some embodiments.

In some embodiments, an alert delivery service can be implemented according to an Incremental Build process, an example being depicted in FIG. 33. In some embodiments, the Alert Delivery Service can be implemented using an incremental approach which can try to eliminate and encapsulate dependencies on components (such as ECIF, template repository/ies, etc.) and enable iterative delivery of the Alert Delivery Service components. As such, the components and capabilities represented by example architectures described herein can be developed over multiple releases, with subsequent releases incrementally adding integration with ECIF (for linkage with customer profile).

Figure 34:
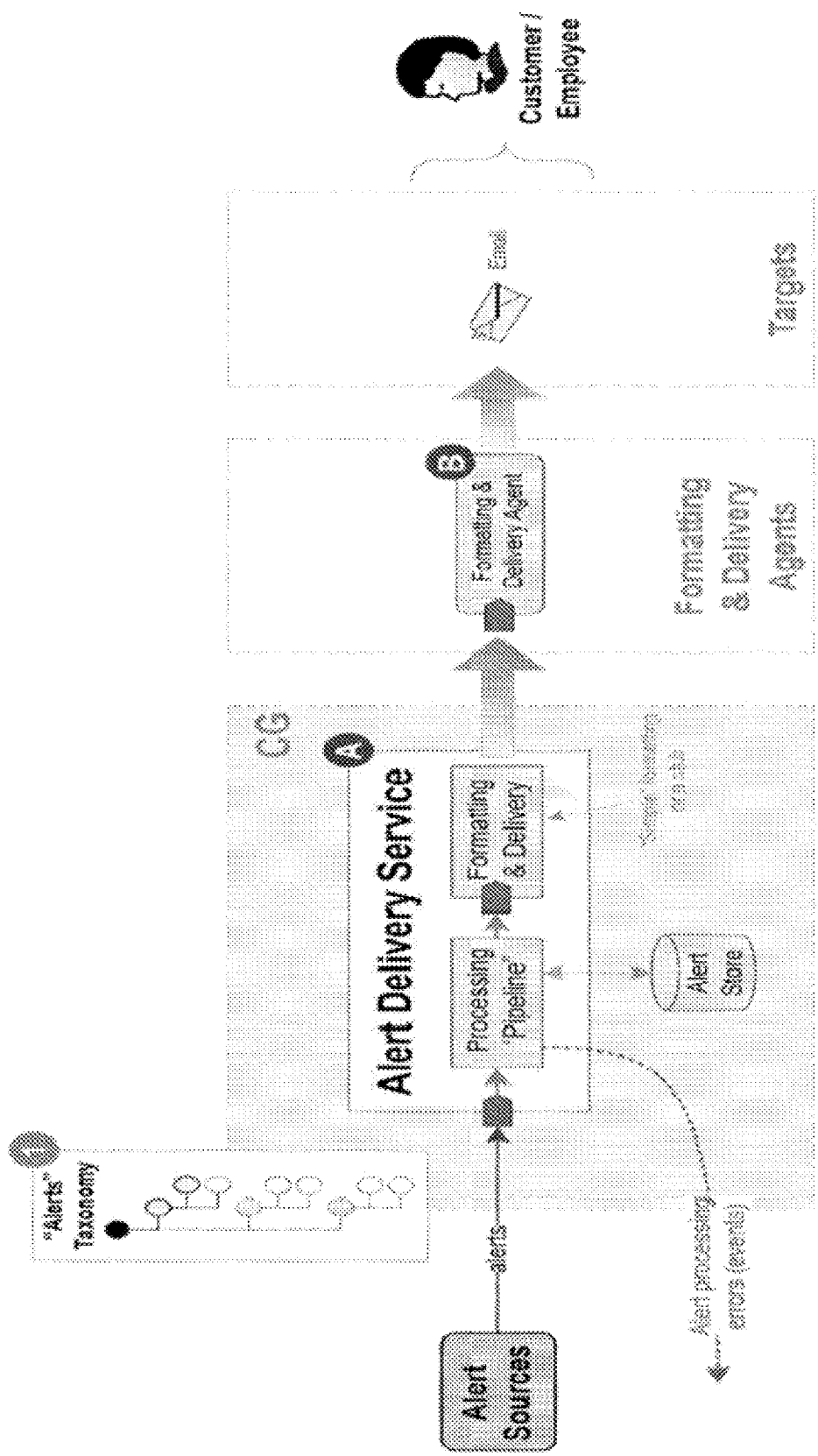
FIG. 34 illustrates a schematic diagram of an example alerting service system, according to some embodiments.

FIG. 34 depicts an example architecture of an example Phase 1 of an Alert Delivery Service build, according to some embodiments. As depicted, there can be provided a single concrete entry in the alerts taxonomy (1) (e.g. eStatementNotification), simple "mechanical" service (A) that exercises end-to-end flow, single target-type (email) (B), and no dependencies on ECIF or template repository.

Figure 35:
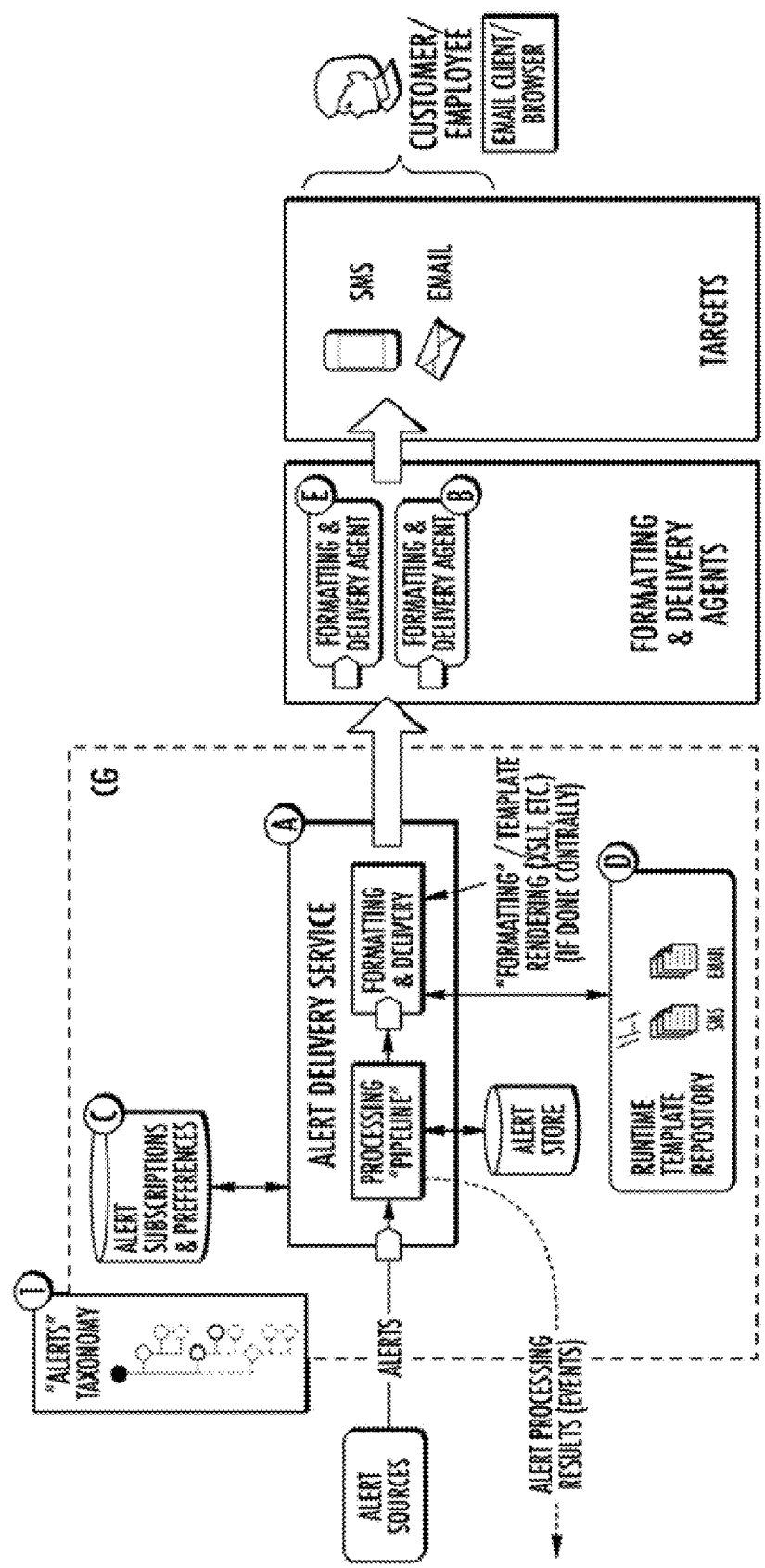
FIG. 35 illustrates a schematic diagram of an example alerting service system, according to some embodiments.

FIG. 35 depicts an example architecture of an example Phase 2 of an Alert Delivery Service build, according to some embodiments. As depicted, during Phase 2, the architecture can additionally include an added interface to AE data store (C) to retrieve customer preferences, added interface to runtime template repository (D), and additional target-type (SMS) (E).

In some embodiments, an Alert Delivery Service provides the ability to send outbound (customer) alerts to customers in the form of emails, SMS messages, etc. taking into account customer communication and other preferences. The Alert Delivery Service's scope includes sending customer alerts (e.g. send an "alert"—offer, notification or alert—to a customer).

Figure 36:
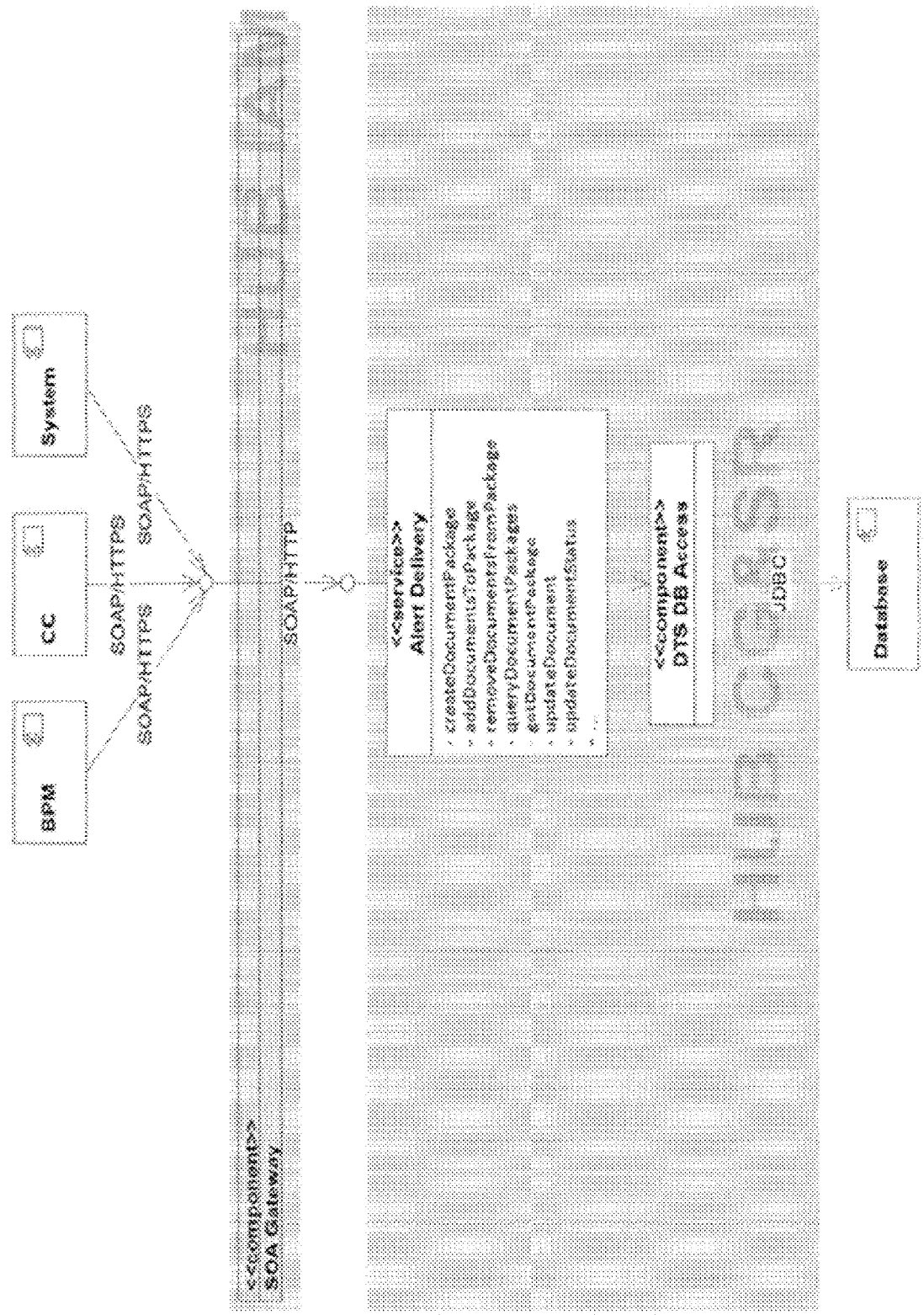
FIG. 36 illustrates a schematic diagram of an example architecture for an alerting service system, according to some embodiments.

FIG. 36 is a schematic diagram showing example Component Interaction in relation to an Alert Delivery Service, according to some embodiments. As depicted, Hub CG&SR includes an Alert Delivery Service as well as a DTS DB Access component, which can transmit data to a database unit. The Alert Delivery Service can receive data from business process management, customer connect, and System units, through a SOA Gateway component.

The following table describes significant architectural design decisions that may be reflected in some embodiments of an Alert Delivery Service architecture and how these decisions bring a bank (or other organization) to a desired target state.

| Decision Type | Architecture Topics | Decision Summary | Rationale for the Decision |
|---|---|---|---|
| Architectural | Preference Placement | Use AE data store to store customer communication preferences, linked to the ECIF at the profile level. | Contain Alert Engine specific artefacts within solution package |
| Architectural | Notification to Alert Sources | The ADS will use a fire-and-forget approach and will not notify alert sources when alerts are sent and/or delivered. Only failures will be reported (via an error queue). | Maximize throughput and scalability by implementing an asynchronous interface. |
| Management | Implementation Strategy | The ADS will be implemented using a phased approach, with initial release(s) building a simple delivery "pipeline" with no dependencies on MDM. As additional aspects (e.g. Gear2) become known subsequent phases will implement additional capabilities. | Complexity, risk mitigation. |

In some embodiments, the system can provide for monitoring adds, changes and deletes to a portfolio as follows.

| Portfolio Monitoring Application View | |
|---|---|
| Number of new applications added | 0 |
| Number of applications retired | 0 |
| HUB VIEW Number of applications changed | |
| Adaptor to HUB | 0 |
| Migrated to HUB | 0 |
| Leverage existing service in HUB | 0 |

The "number of apps changed" can be tabulated to include key functions and apps that have been changed in the following ways:
 Connected to the HUB via an adaptor
 Consumption of CIF information from MDM/HUB
 Consumption Analytic information from HUB and/or Virtual EDW
 Migration of orchestration to the HUB
 Migration of business logic to the HUB
 Migration of presentation logic to the HUB
 Moved to strategic standards from non-strategic standards (includes platforms)

Some use cases of some embodiments of an alert delivery service system follow.

In order to demonstrate collaboration between key components, the following use cases can be considered architecturally-significant: e-Statement Notification, Fraud Alert, and Credit Card Offers.

In an example process for e-Statement Notifications, an e-Statement notification ("alert message") is received by the Alert Delivery Service (ADS). Customer preferences indicate that "low priority" notifications (like e-statement notifications) should be sent via email and may not be sent between 8 am and 5 pm. The "alert" is received by ADS at 10 am in the morning and is held until 5 pm, at which time it is scheduled to be sent to the customer as an email.

In an example process for Fraud Alerts, data indication that a customer's Master Card has been frozen due to possible fraud, is received by the ADS. Customer preferences indicate that "high priority" notifications (like fraud notifications) should be sent via SMS and be sent immediately. Even though there are thousands of e-statement notifications being processed, the ADS schedules the fraud alert for immediate delivery, giving it priority over other, "lower priority" alerts.

In an example process for Credit-card Offers, an offer for a new credit-card is sent to the ADS to be delivered to a customer. The customer has previously opted out from CEM (commercial electronic messages) and this decision is reflected in the customer's anti-spam preferences stored in MDM. The ADS suppresses the offer message and a notification is posted (via an error queue). In some embodiments, the alert source would have been aware of the customer preferences up front and would not have sent an offer.

Figure 37:
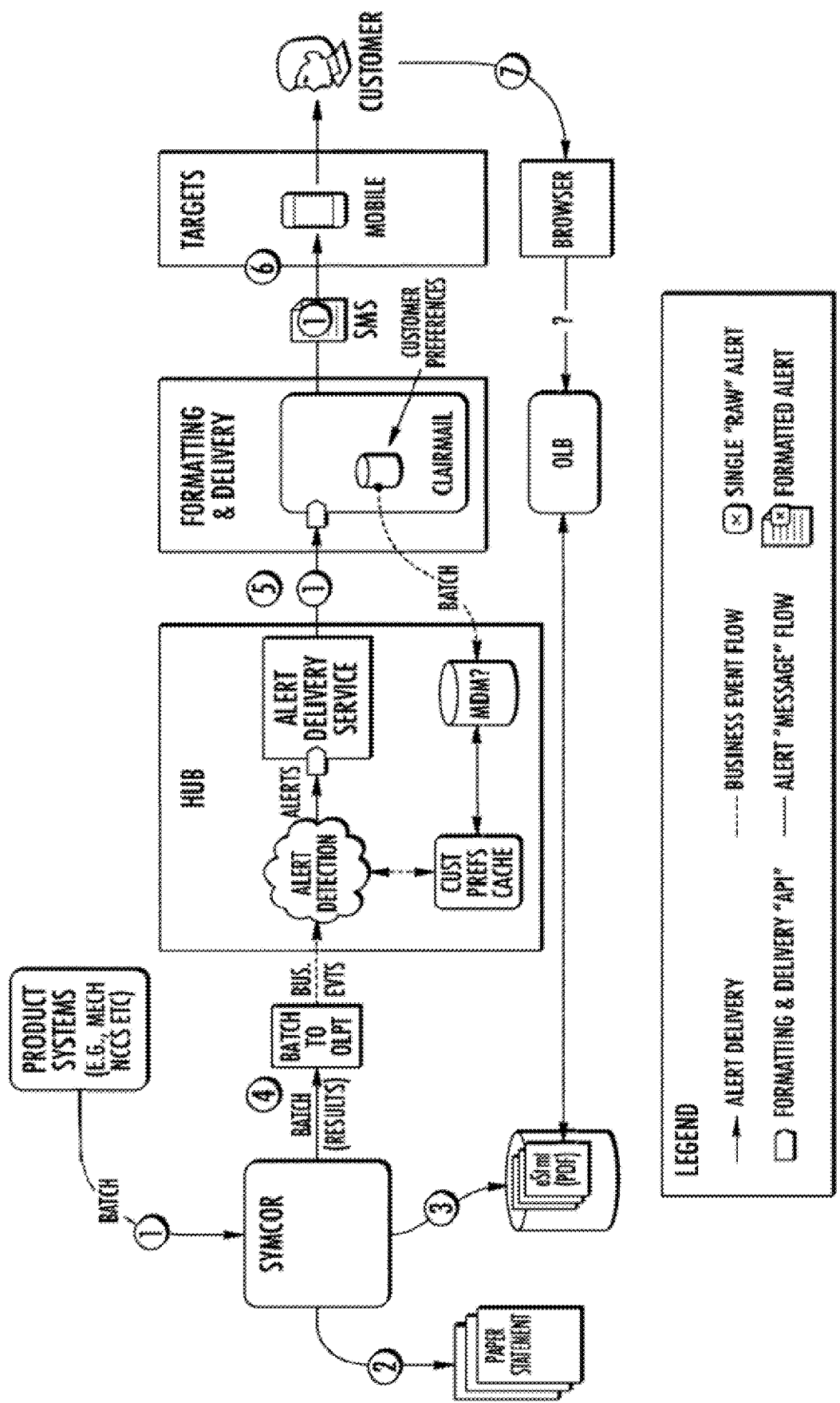
FIG. 37 illustrates a schematic diagram of an example alerting service system, according to some embodiments.

FIG. 37 is a schematic diagram of an example process for UC1: sending e-Statement Notifications, according to some embodiments. As depicted, at 1, product systems unit sends batch data to an item processor. At 2, the item processor sends data to generate paper statements. At 3, the item processor sends data to generate eStatements. At 4, the item processor sends batch results to real-time processing unit. At 5, an alert is sent from an Alert Delivery Service included in a Hub to a formatting and delivery unit. At 6, the formatting and delivery unit sends a formatted alert via SMS to a target, for example, a mobile device. At 7, a customer unit sends data to a browser, which can interconnect with an online banking system unit, which can interconnect with other components to generate eStatements.

In some embodiments, various infrastructures and network topologies can be used to implement various embodiments of an Alert Delivery Service.

An Alert Delivery Service in various embodiments can have the following performance metrics.

| Non-functional requirement | Embodiment A | Embodiment B | Embodiment C |
|---|---|---|---|
| Availability Disaster Recovery | 99.9% | 99.9% | 99.9% |
| "Response Time" (that is, time taken to deliver alert once it is received by ADS) | <10 sec | <10 sec | , 10 sec |
| Transactional volume | ~10 alerts/sec | ~50 alerts/sec | ~200 alerts/sec Maximum spike volume: ~300 alerts/sec |
| Capacity | ~10% growth/year | | |

Various data models can be used by an Alert Delivery Service in various embodiments and implementations.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For simplicity only one computing device 2100 is shown in FIG. 2, but the respective systems may include more computing devices operable by users to access remote network resources and exchange data. The computing devices 2100 may be the same or different types of devices. The computing device 2100 includes at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for generating alert notifications, the system comprising:
    a non-transitory data hub configured to:
        load and store financial transaction data from a plurality of source systems, wherein at least one source system of the plurality of source system includes a type of data source selected from at least one of: a book of record transaction system, a clickstream, social media, a server log, a machine log, or a real-time event stream;
    an alert subscription service processor configured to:
        receive an alert subscription request indicating a subscriber and alert configurations defining an alert type value and an alert detection parameter value associated with an alert notification; and
        generate an alert subscription corresponding to the alert configurations, the alert subscription having a trigger for the alert type value and the alert detection parameter value associated with a key-value pair of volatile memory of the non-transitory data hub for in-memory event detection within the non-transitory data hub;
an alert service processor configured to:
detect a financial transaction event in real time based upon the in-memory event detection, the financial transaction event corresponding to correlated event data based on in-memory event correlation using the financial transaction data stored at the non-transitory data hub;
execute in-memory event correlation to generate an alert based on the financial transaction event by a customer that satisfies the trigger of the alert subscription according to the alert configurations;
generate alert data in real time based on the correlated event data using the financial transaction data stored at the non-transitory data hub;
a formatting and delivery processor configured to:
generate the alert notification for the subscriber based on the alert data and format the alert notification based on the alert subscription, wherein the alert notification includes an actionable alert including an offer to the customer based on the financial transaction event; and
transmit the alert notification to a target unit identified by the subscriber based on the alert subscription.

2. The system of claim 1, wherein the alert subscription request is received via an interface providing a catalogue of alert definitions for the data hub, each alert definition defining an alert type and alert detection parameters.

3. The system of claim 1, wherein in-memory event correlation is configured to perform at least one of duplicate detection, suppression, suspension of data.

4. The system of claim 1, wherein the subscriber is linked to an alert format and at least one processor is configured to format the alert data based on the alert format of the target unit.

5. The system of claim 1, wherein the alert notification is assigned an alert identifier and wherein at least one processor stores data for the alert notification and the alert identifier in a history log.

6. The system of claim 5, further comprising:
an alert handler configured to monitor the alert notification for user response and record the user response in association with the alert identifier.

7. The system of claim 1, wherein the alert notification is assigned an action identifier, wherein the action identifier is a pointer to code for adding an action to the alert notification.

8. The system of claim 1, wherein the alert subscription service is configured to store a mapping between a customer identifier, customer preferences, and an alert rule, the subscriber being linked to the customer identifier.

9. The system of claim 1, further comprising an application programming interface to receive the alert subscription request.

10. A system for generating alert notifications comprising a non-transitory machine-readable computer medium comprising a set of instructions, that when executed, cause a processor to:
load and store financial transaction data from a plurality of source systems, wherein at least one source system of the plurality of source system includes a type of data source selected from at least one of: a book of record transaction system, a clickstream, social media, a server log, a machine log, or a real-time event stream;
receive an alert subscription request indicating a subscriber and alert configurations defining an alert type value and an alert detection parameter value associated with an alert notification;
generate an alert subscription corresponding to the alert configurations, the alert subscription having a trigger for the alert type value and the alert detection parameter value associated with a key-value pair of volatile memory of the non-transitory data hub for in-memory event detection within the non-transitory data hub;
detect a financial transaction event in real time based upon the in-memory event detection, the financial transaction event corresponding to correlated event data based on in-memory event correlation using the financial transaction data stored at the non-transitory data hub;
execute in-memory event correlation to generate an alert based on the financial transaction event by a customer that satisfies the trigger of the alert subscription according to the alert configurations;
generate alert data in real time based on the correlated event data using the financial transaction data stored at the non-transitory data hub;
generate the alert notification for the subscriber based on the alert data and format the alert notification based on the alert subscription, wherein the alert notification includes an actionable alert including an offer to the customer based on the financial transaction event; and
transmit the alert notification to a target unit identified by the subscriber based on the alert subscription.

11. The system of claim 10, wherein the alert subscription request is received via an interface providing a catalogue of alert definitions for the data hub, each alert definition defining an alert type and alert detection parameters.

12. The system of claim 10, wherein in-memory event correlation is configured to perform at least one of duplicate detection, suppression, suspension of data.

13. The system of claim 10, wherein the subscriber is linked to an alert format and at least one processor is configured to format the alert data based on the alert format of the target unit.

14. The system of claim 10, wherein the alert notification is assigned an alert identifier and wherein at least one processor stores data for the alert notification and the alert identifier in a history log.

15. The system of claim 14, wherein the set of instructions further cause the processor to monitor the alert notification for user response and record the user response in association with the alert identifier.

16. The system of claim 10, wherein the alert notification is assigned an action identifier, wherein the action identifier is a pointer to code for adding an action to the alert notification.

17. The system of claim 10, wherein the alert subscription service is configured to store a mapping between a customer identifier, customer preferences, and an alert rule, the subscriber being linked to the customer identifier.

18. The system of claim 10, wherein the set of instructions further cause the processor to use an application programming interface to receive the alert subscription request.

19. A method comprising:
loading and storing, by a processor, financial transaction data from a plurality of source systems, wherein at least one source system of the plurality of source system includes a type of data source selected from at least one of: a book of record transaction system, a clickstream, social media, a server log, a machine log, or a real-time event stream;

receiving, by the processor, an alert subscription request indicating a subscriber and alert configurations defining an alert type value and an alert detection parameter value associated with an alert notification;

generating, by the processor, an alert subscription corresponding to the alert configurations, the alert subscription having a trigger for the alert type value and the alert detection parameter value associated with a key-value pair of volatile memory of a non-transitory data hub for in-memory event detection within the non-transitory data hub;

detecting, by the processor, a financial transaction event in real time based upon the in-memory event detection, the financial transaction event corresponding to financial transaction data stored at the non-transitory data hub;

executing, by the processor, execute in-memory event correlation to generate an alert based on the financial transaction event by a customer that satisfies the trigger of the alert subscription according to the alert;

generating, by the processor, alert data in real time based on the correlated event data using the financial transaction data stored at the non-transitory data hub;

generating, by the processor, the alert notification for the subscriber based on the alert data and format the alert notification based on the alert subscription, wherein the alert notification includes an actionable alert including an offer to the customer based on the financial transaction event; and transmitting, by the processor, the alert notification to a target unit identified by the subscriber based on the alert subscription.

20. The method of claim 19, wherein the alert subscription request is received via an interface providing a catalogue of alert definitions for the data hub, each alert definition defining an alert type and alert detection parameters.

\* \* \* \* \*